US012767235B2

(12) United States Patent
Anattasakul et al.

(10) Patent No.: US 12,767,235 B2
(45) Date of Patent: Oct. 20, 2026

(54) VEHICLE ROOF INCLUDING SOLAR PANEL

(71) Applicant: KUBOTA CORPORATION, Osaka (JP)

(72) Inventors: Roatchanatam Anattasakul, Fremont, CA (US); Shankar Radhakrishnan, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 296 days.

(21) Appl. No.: 18/593,407

(22) Filed: Mar. 1, 2024

(65) Prior Publication Data

US 2024/0300584 A1 Sep. 12, 2024

Related U.S. Application Data

(60) Provisional application No. 63/451,122, filed on Mar. 9, 2023.

(51) Int. Cl.
*B62D 25/07* (2006.01)
*B60R 16/03* (2006.01)
*B60R 21/13* (2006.01)
*B62D 25/04* (2006.01)
*H02S 10/40* (2014.01)

(52) U.S. Cl.
CPC .............. *B62D 25/07* (2013.01); *B60R 16/03* (2013.01); *B60R 21/13* (2013.01); *B62D 25/04* (2013.01); *H02S 10/40* (2014.12)

(58) Field of Classification Search
CPC ......... Y02T 10/90; B60R 16/03; B62D 25/07; B60P 3/32; B60P 3/39
USPC ........................................................ 296/193.6
See application file for complete search history.

(56) References Cited

U.S. PATENT DOCUMENTS

| | | | | |
|---|---|---|---|---|
| 6,313,394 | B1 | 11/2001 | Shugar et al. | |
| 8,616,310 | B2 | 12/2013 | Lopez | |
| 9,188,980 | B2 | 11/2015 | Anderson | |
| 2002/0174889 | A1* | 11/2002 | Shugar .................... | B60L 8/003 136/251 |
| 2014/0358342 | A1* | 12/2014 | Marks ..................... | B60L 8/003 180/2.2 |
| 2019/0384321 | A1 | 12/2019 | Nishi et al. | |
| 2021/0284244 | A1* | 9/2021 | Ries ....................... | B62D 25/06 |

FOREIGN PATENT DOCUMENTS

| | | | |
|---|---|---|---|
| DE | 10 2006 023 910 | A1 | 11/2007 |
| JP | H1178975 | A | 3/1999 |
| JP | 2002536948 | A | 10/2002 |
| JP | 2005340704 | A | 12/2005 |
| JP | 2006-008076 | A | 1/2006 |

(Continued)

OTHER PUBLICATIONS

Official Communication issued in International Patent Application No. PCT/JP2024/008935, mailed on May 14, 2024.

*Primary Examiner* — Amy R Weisberg
*Assistant Examiner* — Alma D. Schuster
(74) *Attorney, Agent, or Firm* — Keating & Bennett, LLP

(57) ABSTRACT

A vehicle includes a roof supported by a frame connected to a main body of the vehicle or defined by a cabin of the vehicle, and a solar panel is attached to the roof. The solar panel is provided in a main recess of the roof, and the roof includes at least one secondary recess.

18 Claims, 22 Drawing Sheets

(56) References Cited

FOREIGN PATENT DOCUMENTS

| | | | | |
|---|---|---|---|---|
| JP | 2006027571 | A | | 2/2006 |
| JP | 2011029454 | A | | 2/2011 |
| JP | 2016002874 | A | * | 1/2016 |
| WO | 2000046056 | A1 | | 8/2000 |

* cited by examiner

VEHICLE ROOF INCLUDING SOLAR PANEL

BACKGROUND OF THE INVENTION

1. Field of the Invention

The present invention relates to a vehicle roof that includes a solar panel. More specifically, the present invention relates to a work vehicle or tractor that is able to be autonomously operated by electronics that can be powered by a solar panel provided in a roof of the work vehicle.

2. Description of the Related Art

Known work vehicles or tractors have included navigation systems and electrical power generation capabilities. However, known work vehicles or tractors have not optimized the location and implementation of navigation system components and electrical power generation components, including solar panels. Furthermore, designs of known work vehicles or tractors have not considered repositioning of cooling components, such as a radiator.

U.S. Patent Application Publication No. 2019/0384321 discloses a tractor with a roof that includes water drain grooves. The tractor of U.S. Patent Application Publication No. 2019/0384321 further includes monitoring cameras, a sonar device, a laser scanner to detect obstacles, and a Global Navigation Satellite System (GNSS), such as a GPS (Global Positioning System). However, the tractor of U.S. Patent Application Publication No. 2019/0384321 does not include a solar panel and only generally teaches providing the GPS on a roof of the tractor. Furthermore, the tractor of U.S. Patent Application Publication No. 2019/0384321 discloses that a radiator is provided at a conventional location in a front position of a vehicle body of the tractor, underneath a hood of the tractor.

U.S. Pat. No. 8,616,310 discloses an electric tractor with an electric motor that is powered by batteries. The batteries of U.S. Pat. No. 8,616,310 can be recharged by an on-board photoelectric panel (solar panel) that is located on a canopy frame of the tractor. However, U.S. Pat. No. 8,616,310 is silent regarding the specific structure or implementation of the solar panel, and the tractor does not include any navigation system. Furthermore, the tractor of U.S. Pat. No. 8,616,310 does not include a radiator or any other cooling components.

German Patent Publication No. 10 2006 023 910 discloses a tractor including an internal combustion engine and photovoltaic units (solar panels) provided on outer surfaces of the tractor to generate electricity used to cool a cooling circuit and/or the engine of tractor. However, German Patent Publication No. 10 2006 023 910 only generally discloses solar panels provided on surfaces of the tractor, such as the roof and the hood, but is silent regarding the specific structure or implementation of the solar panels. The tractor of German Patent Publication No. 10 2006 023 910 also does not include any navigation system. Furthermore, the tractor of German Patent Publication No. 10 2006 023 910 includes a radiator that is provided at a conventional location in a front position of the vehicle body of the tractor, underneath a hood of the tractor.

SUMMARY OF THE INVENTION

Preferred embodiments of the present invention provide a work vehicle or tractor that is able to be autonomously operated by electronics that can be powered by a solar panel provided in or on a roof of the work vehicle or tractor. Preferred embodiments of the present invention also provide a work vehicle or tractor that includes cooling components provided in or on a roof of the work vehicle or tractor.

A vehicle according to an embodiment of the present invention includes a roof supported by a frame connected to a main body of the vehicle or defined by a cabin of the vehicle, and a solar panel is attached to the roof. The solar panel is provided in a main recess of the roof, and the roof includes at least one secondary recess.

The at least one secondary recess can be continuous with the main recess. The at least one secondary recess can be a drain groove. The at least one secondary recess can be structured to be inclined away from the main recess. The main recess can be structured to be inclined toward the at least one secondary recess.

The vehicle can further include at least one electrical component that is mounted on or integrated with the roof, and the secondary recess can be positioned to not overlap, in a vertical direction, with the at least one electrical component. The at least one electrical component can include one or more of a light source, a weather sensor, a camera, and a GPS (Global Positioning System) sensor. The at least one electrical component can be provided within a length of the main body of the vehicle in a front-rear direction and within a width of the main body of the vehicle in a left-right direction. An innermost edge of the secondary recess can be located outside of an outermost edge of the at least one electrical component in a left-right direction.

The vehicle can further include a windshield. The secondary recess can be positioned to not overlap, in a vertical direction, with the windshield of the vehicle. The main recess of the roof can be defined by a recess in an upper surface of the roof, and a distance between the main recess of the roof and the upper surface of the roof can increase towards a center of the roof in a left-right direction.

The vehicle can further include at least one GPS (Global Positioning System) sensor provided on the roof. The at least one GPS sensor can be provided in a GPS recess in a main surface of the roof. The at least one GPS sensor can include one or more GPS sensors located at an end of the roof opposite to an end of the roof that includes the at least one secondary recess. The at least one GPS sensor can be located on, or substantially symmetrical about, at least one of a longitudinal centerline and a lateral centerline of the vehicle.

The secondary recess can be located at a front portion of the roof and extends a first distance in a front-rear direction. The roof can further include a tertiary recess located at a rear portion of the roof and extending a second distance in the front-rear direction. The first distance can be greater than the second distance.

The roof can include an interior void space in which at least one electrical component or at least one cable is provided.

The vehicle can further include at least one support pillar that is attached to or integrated with the roof. The at least one support pillar and the roof can define a roll-over protection system for the vehicle.

A portion or an entirety of the solar panel can be inclined with respect to a main surface of the roof.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
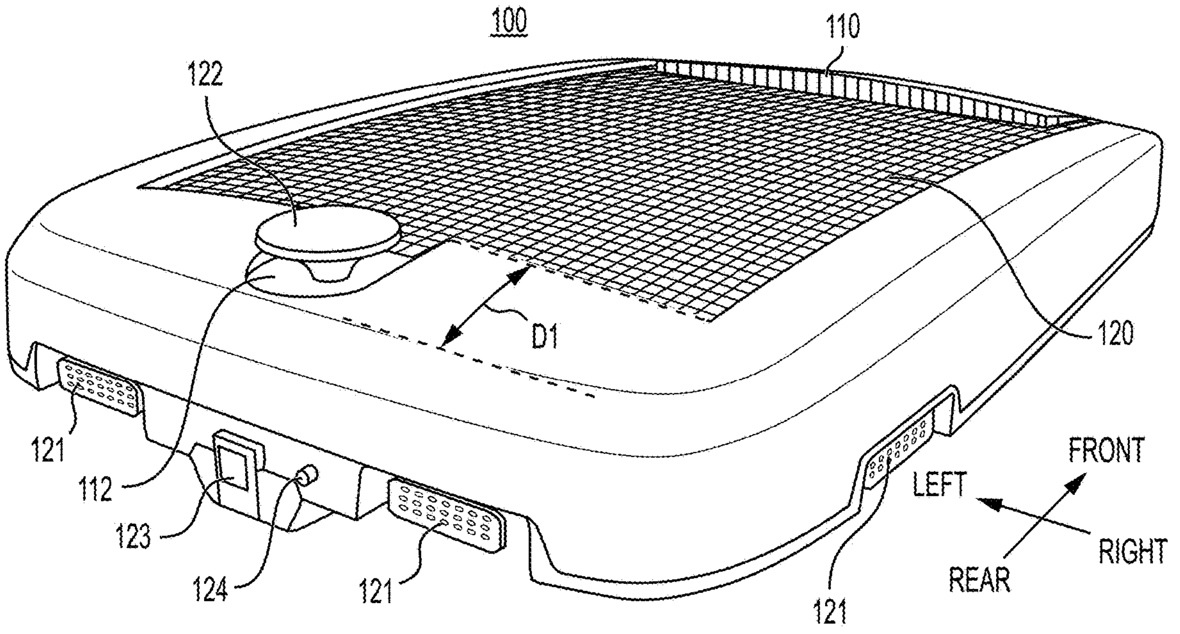
FIGS. 1 and 2 are perspective views of a vehicle roof according to a preferred embodiment of the present invention.
Figure 2:
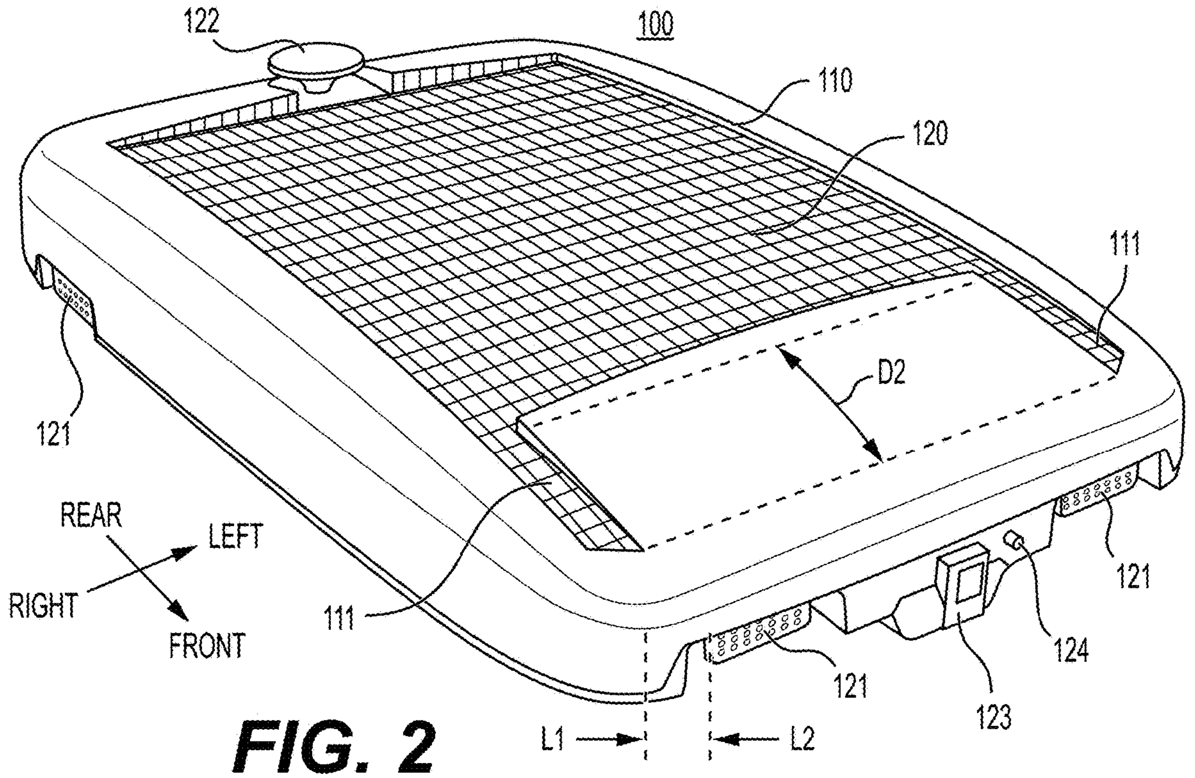
Figure 3:
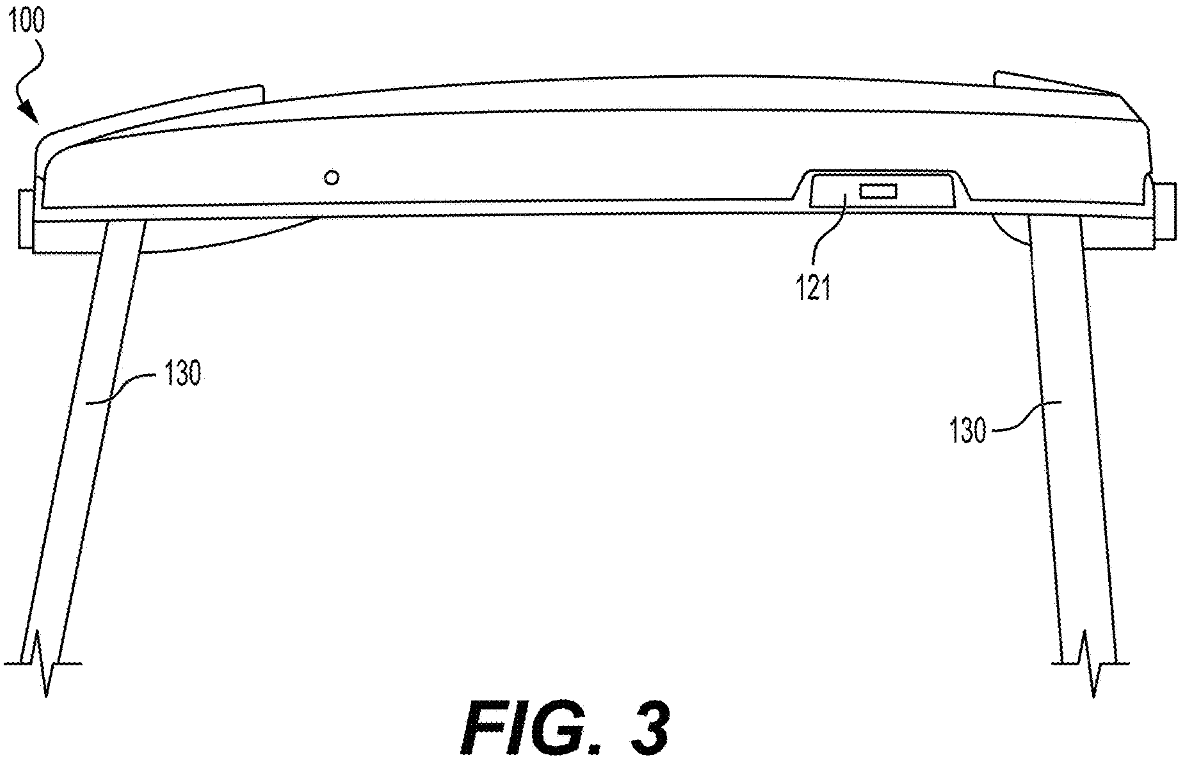
FIG. 3 is a side view of the vehicle roof shown in FIGS. 1 and 2.

FIGS. 1-3 show a vehicle roof 100 according to a preferred embodiment of the present invention. FIG. 1 shows a view from a second end of the vehicle roof 100, FIG. 2 shows a view from a first end of the vehicle roof 100, and FIG. 3 shows a side view of the vehicle roof 100.

As shown in FIGS. 1 and 2, the vehicle roof 100 can include a solar panel 120, one or more light sources 121, a GPS sensor 122, and one or more sensors 123 and 124. The one or more sensors 123 and 124 can include one or more of a LiDAR (light detection and ranging) sensors, weather sensors, cameras, and the like. If one or more weather sensors are included, the weather sensors can be located at the second end of the vehicle roof 100 with respect to location of the solar panel 120. Power and/or data cables for the solar panel 120, the one or more light sources 121, the GPS sensor 122, and the one or more sensors 123 and 124 can be routed through an interior of the vehicle roof 100.

FIGS. 1 and 2 show that a main (upper) surface of the vehicle roof 100 includes a main recessed portion 110, and the solar panel 120 can be provided within the main recessed portion 110. As shown in FIG. 2, secondary recesses 111 can extend from the main recessed portion 110 toward the first end of the vehicle roof 100. The solar panel 120 may or may not extend into the secondary recesses 111. The secondary recesses 111 can define drain grooves that allow liquids and debris to be removed from the main recessed portion 110, and the secondary recesses 111 can be structured to slope downward from the main recessed portion 110 to facilitate draining. The main recessed portion 110 can also be structured to slope downward from the second end of the vehicle roof toward the first end of the vehicle roof. For example, the secondary recesses 111 can be structured to enable water from rain or sprinklers to easily drain away from the main recessed portion 110, or to enable debris that falls on the solar panel 120 (for example, dirt or leaves) to be easily washed away. Accordingly, by quickly guiding and diverting water and/or debris away from the main recessed portion, an efficiency of the solar panel 120 in receiving light is able to be significantly increased.

Furthermore, a portion or the entirety of the solar panel 120 can be inclined with respect to the main (upper) surface of the vehicle roof 100. That is, the solar panel 120 can define an inclined surface relative to the main (upper) surface of the vehicle roof 100. In addition, the solar panel 120 can be inclined with respect to ground plane in contact with wheels or treads of a vehicle that includes the vehicle roof 100.

The vehicle roof 100 can also include the one or more light sources 121, and the light sources 121 can be provided in or on side surfaces of the vehicle roof 100, as shown in FIGS. 1-3. The GPS sensor 122 can be provided on the main (upper) surface of the vehicle roof 100, and can be located within a corresponding GPS (tertiary) recess 112 of the vehicle roof 110. The GPS sensor 122 can be located at the second end of the vehicle roof 100. That is, the GPS sensor 122 is located at an opposite end of the vehicle roof 100 with respect to the secondary recesses 111. In addition, the secondary recesses 111 can be arranged to not overlap, in a vertical direction, with the one or more light sources 121 and the one or more sensors 123 and 124. More specifically, as shown in FIG. 1, an innermost edge L1 of each of the secondary recesses 111 can be arranged outside of an outermost edge L2 of each of the plurality of light sources 121 in a left-right direction of the vehicle roof 100. The secondary recesses 111 can also be positioned so as to not drain water directly on a windshield of a vehicle on which the vehicle roof 100 is mounted, thereby avoiding obscuring visibility of an operator of the vehicle. Alternatively or in addition, the secondary recesses 111 can be structured with shapes and/or angles that prevent water from directly draining into a line-of-sight of the operator of the vehicle.

As shown in FIGS. 1 and 2, the GPS (tertiary) recess 112 extends a first distance D1 in a front-rear direction of the vehicle roof 100, and the secondary recesses 111 extend a second distance D2 in the front-rear direction of the vehicle roof 100. According to a preferred embodiment of the present invention, the second distance D2 is greater than the first distance D1. Thus, a front portion of the vehicle roof 100 can be provided with a greater space than a rear portion of the vehicle roof 100 due to the second distance D2 being greater than the first distance D1. Accordingly, the front portion of the vehicle roof 100 can be configured to accommodate additional autonomous or electrical devices, such as additional sensor(s).

As shown in FIG. 1, the rear portion of the vehicle roof 100 can be defined in an arched shape with respect to the main recessed portion 110. According to a preferred embodiment of the present invention, a height of the main (upper) surface of the vehicle roof 100 with respect to the main recessed portion 110 can increase from a rightmost or leftmost edge of the main recessed portion 110 towards the GPS (tertiary) recess 112. That is, a distance between the main (upper) surface of the vehicle roof 100 and the main recessed portion 110 can increase toward a center of the vehicle roof 100 in the left-right direction of the vehicle roof 100.

FIG. 3 further shows that the vehicle roof 110 can be attached to, or integrated with, support pillars 130. A structure including the vehicle roof 110 and the support pillars 130 can define a roll-over protection system (ROPS) for a vehicle.

Figure 4:
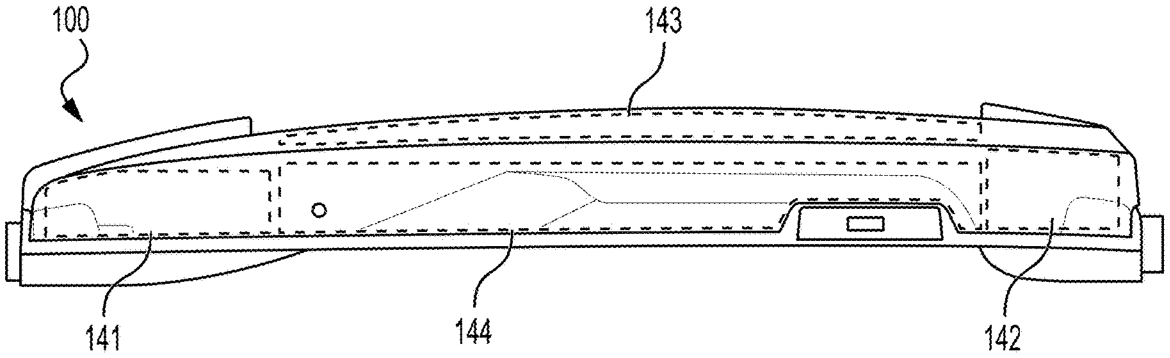
FIGS. 4 and 5 show implementations of an interior of the vehicle roof shown in FIGS. 1 and 2.

FIG. 4 is a side view of the vehicle roof 100 showing one implementation of an approximate interior space of the vehicle roof 100. As shown in FIG. 4, an interior of the vehicle roof 100 includes a first void space 141 and a second void space 142. The first void space 141 and the second void space 142 can store wiring, electrical components, electrical supplies (e.g., batteries, charge controllers, power converters such as a DC-DC converter, power inverters, and/or communication devices), and the like. However, an upper central space 143 of the interior of the vehicle roof 100 is occupied by the main recessed portion 110, and a lower central space 144 of the interior of the vehicle roof 100 can include a recess for a cabin of a vehicle on which the vehicle roof 100 is mounted. Accordingly, although the first void space 141 and the second void space 142 can be utilized to store components, a central portion of the interior of the vehicle roof 100 is not able to include larger components. It is noted that smaller elements, such as electrical wiring, could still be provided between the upper central space 143 and the lower central space 144.

Figure 5:
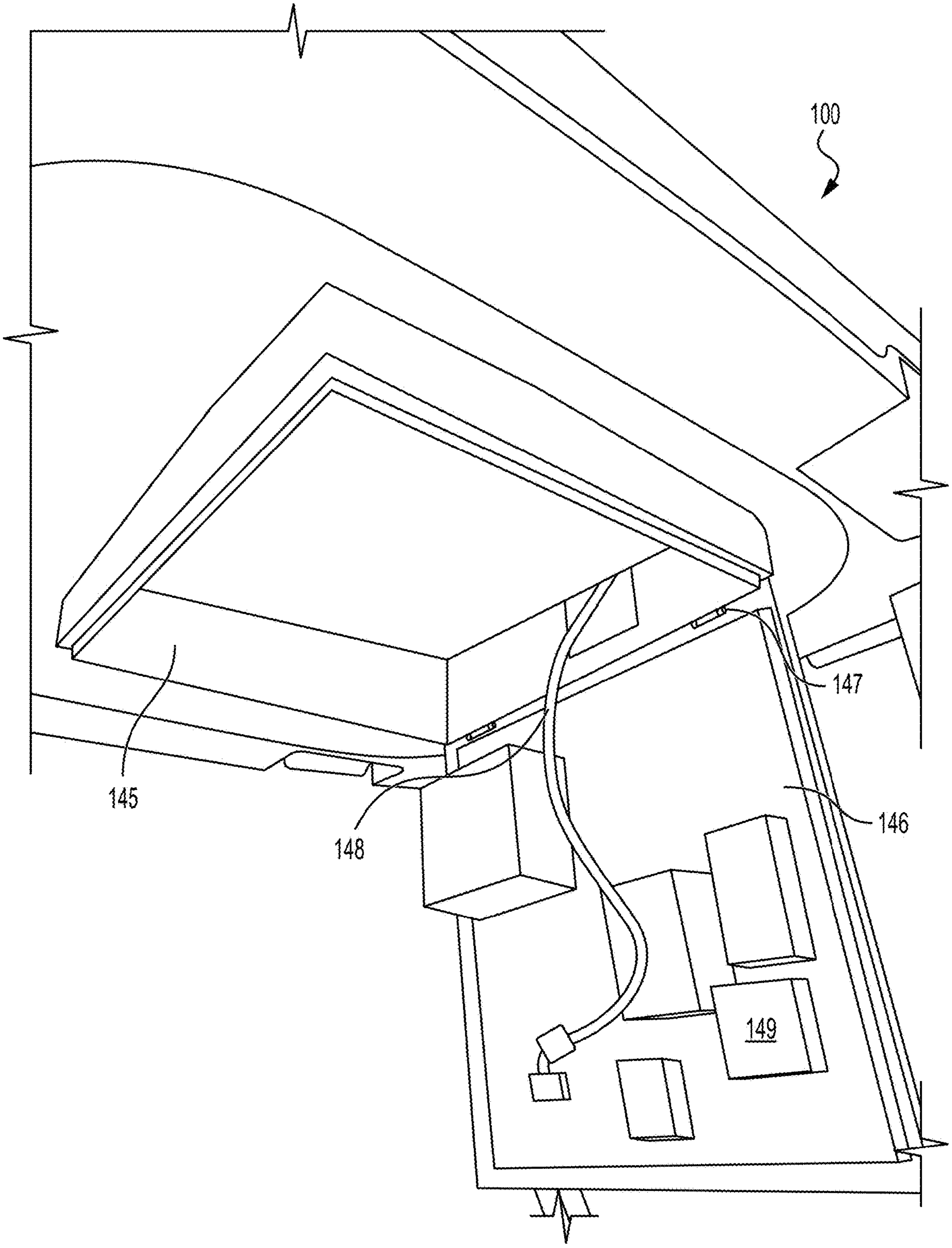

FIG. 5 is a perspective view of an implementation of the vehicle roof 100 to include a compartment 145 in the interior space of the vehicle roof. The compartment 145 can be an enclosed space, such as an electronics housing, and can include a door 146. The door 146 can be opened at a lower portion of the compartment 145, for example, such that the door 146 is provided at an interior space in a cabin of a vehicle to which the vehicle roof 100 is mounted. The door 146 can be fixed to the compartment 145 or the vehicle roof 100 by a hinge 147 or the like. Similar to the first void space 141 and the second void space 142 described with respect to FIG. 4, the compartment 145 can store wiring, electrical components, electrical supplies (e.g., batteries, charge controllers, power converters such as a DC-DC converter, power inverters, and/or communication devices), and the like. As an example, FIG. 5 shows that a wiring harness 148 and electrical components 149 can be stored within the compartment 145. The electrical components 149 shown in FIG. 5 can include an edge computing unit, a GPS controller, a router, a DC-DC converter, and the like. Although some communication circuitry can be included in the compartment 145, communication antennas (e.g., a Wi-Fi antenna) are preferably not included within the compartment 145 to avoid interference in wireless communications. As shown in FIG. 5, the electrical components 149 can be fixed to the door 146.

Figure 6A:
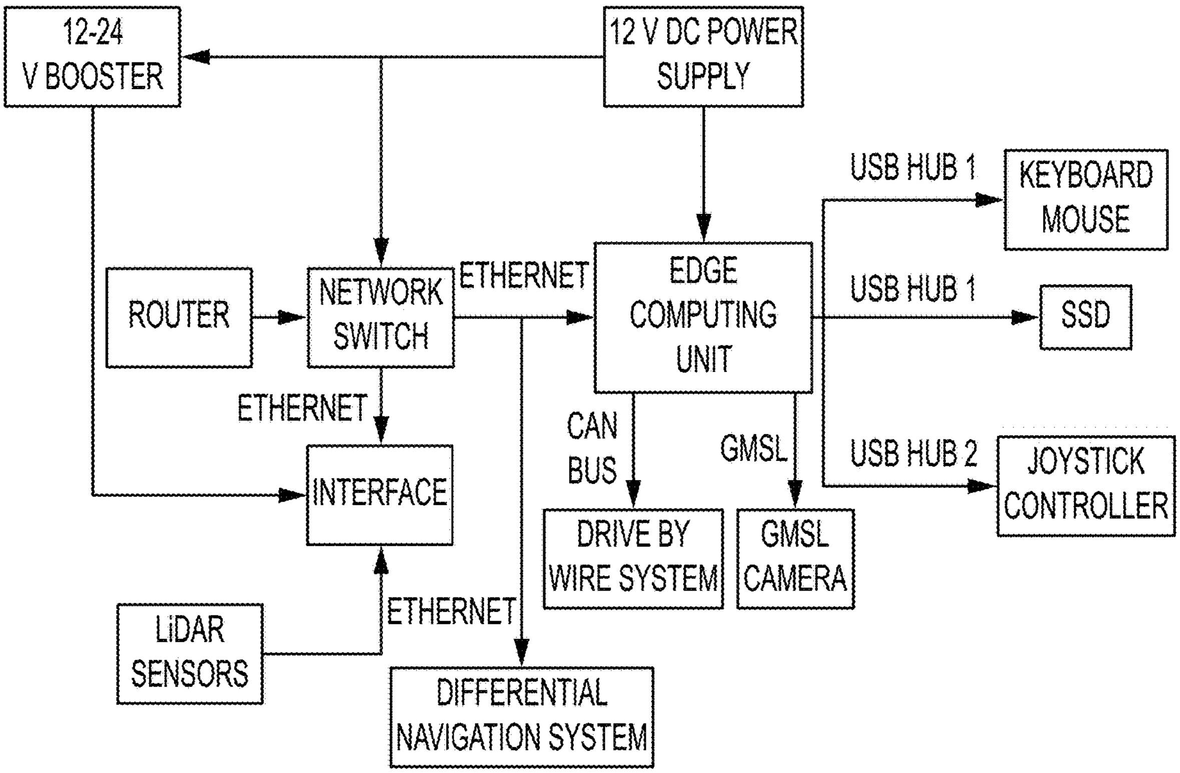
FIGS. 6A to 6C show examples of wiring diagrams of electrical components that can be included in, attached to, or connected with the vehicle roof shown in FIGS. 1 and 2.
Figure 6B:
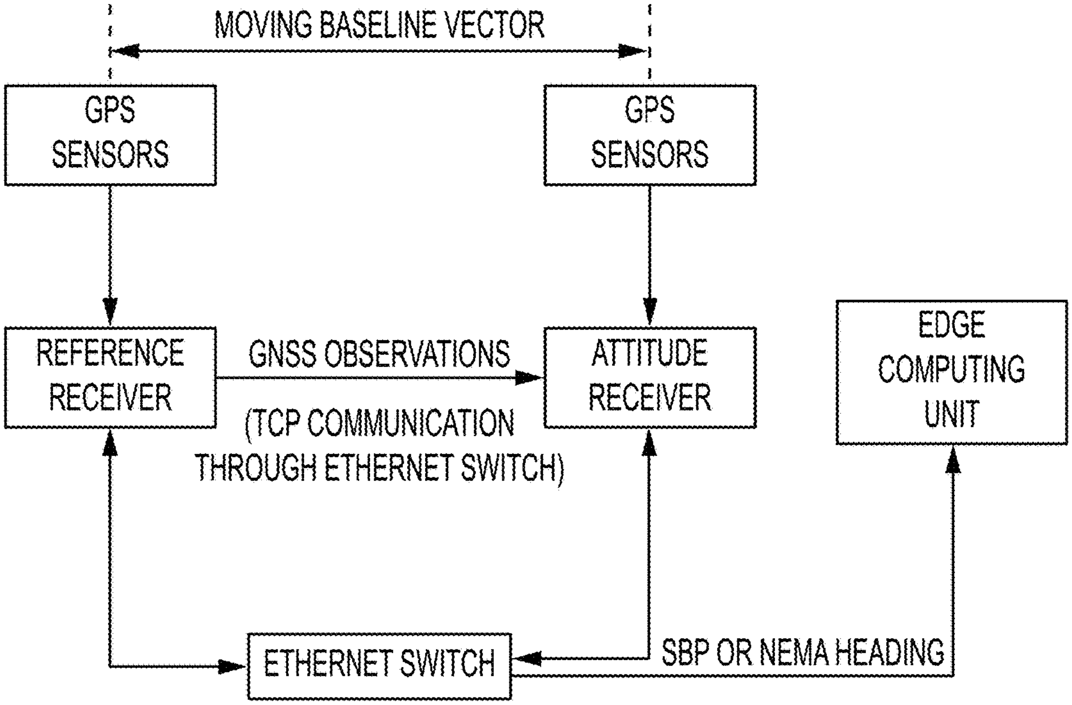
Figure 6C:
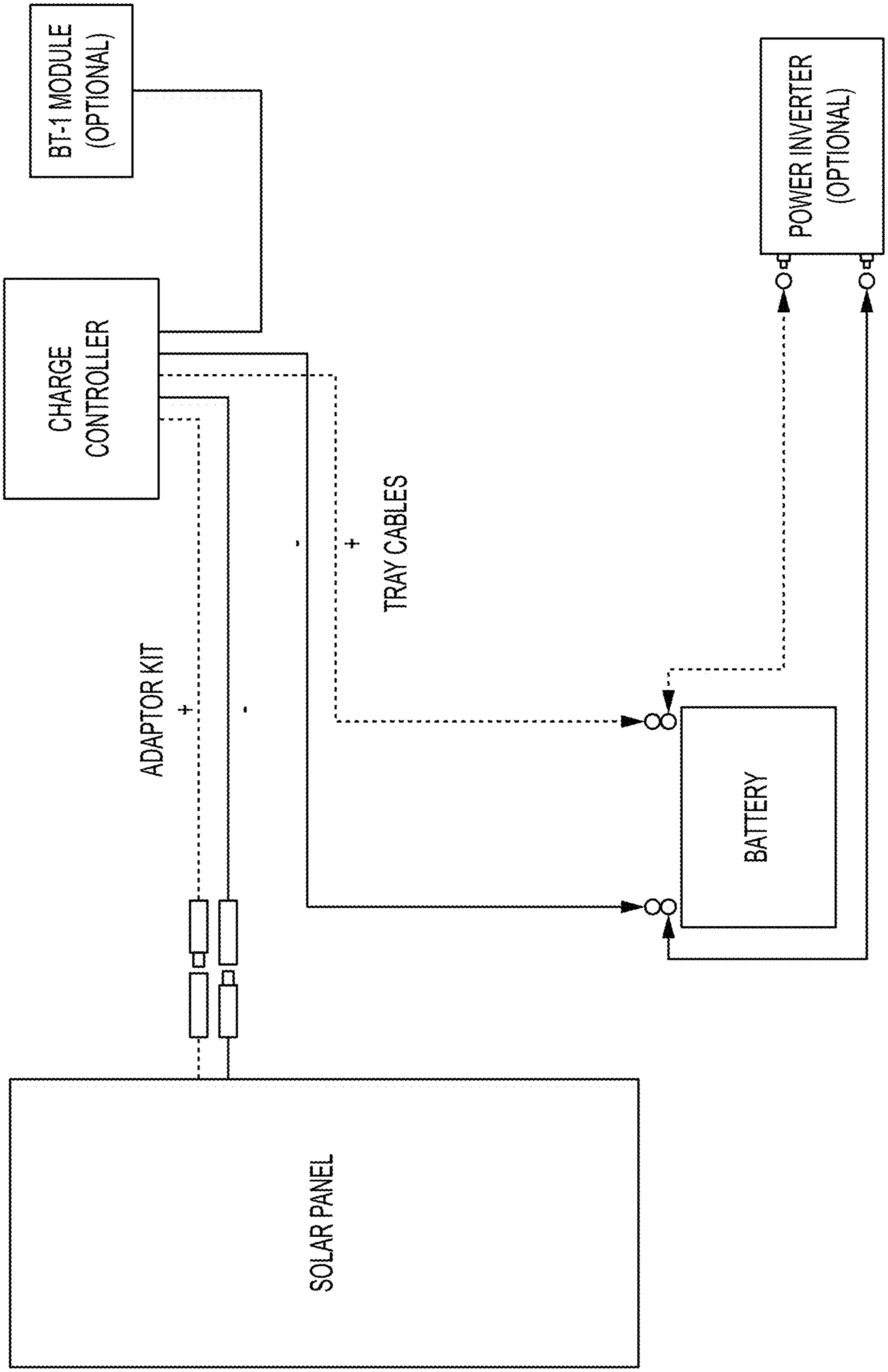

FIGS. 6A to 6C show examples of wiring diagrams of electrical components that can be included in, attached to, or connected with the vehicle roof 100. At least a portion of the electrical components shown in FIGS. 6A to 6C can be included in the first void space 141 and the second void space 142 shown in FIG. 4 or included in the compartment 145 shown in FIG. 5.

Figure 7:
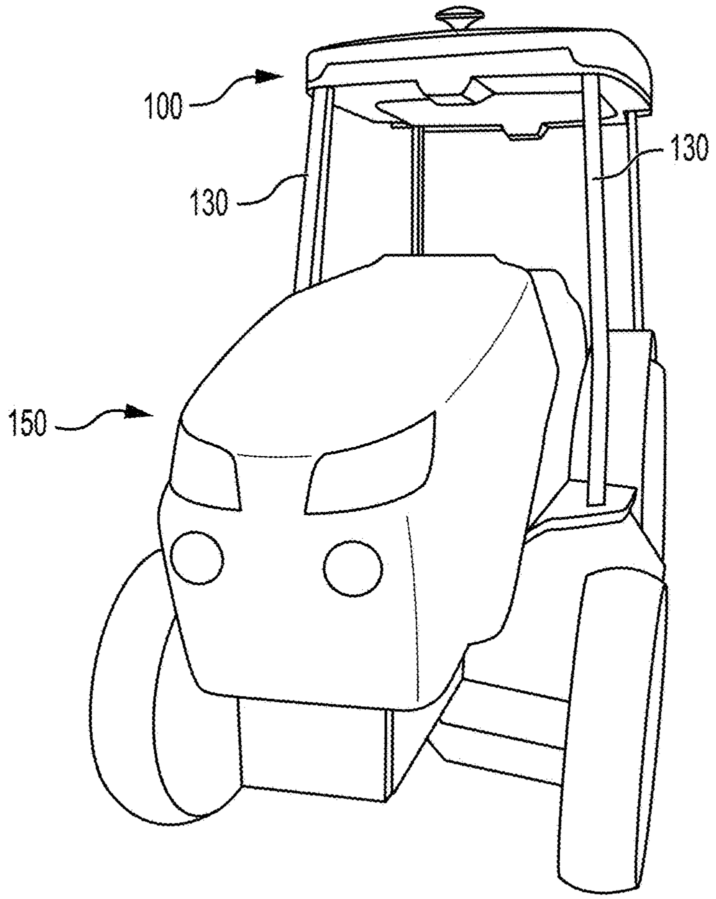
FIGS. 7 and 8 are views of the vehicle roof shown in FIGS. 1 and 2 mounted to a vehicle.
Figure 8:
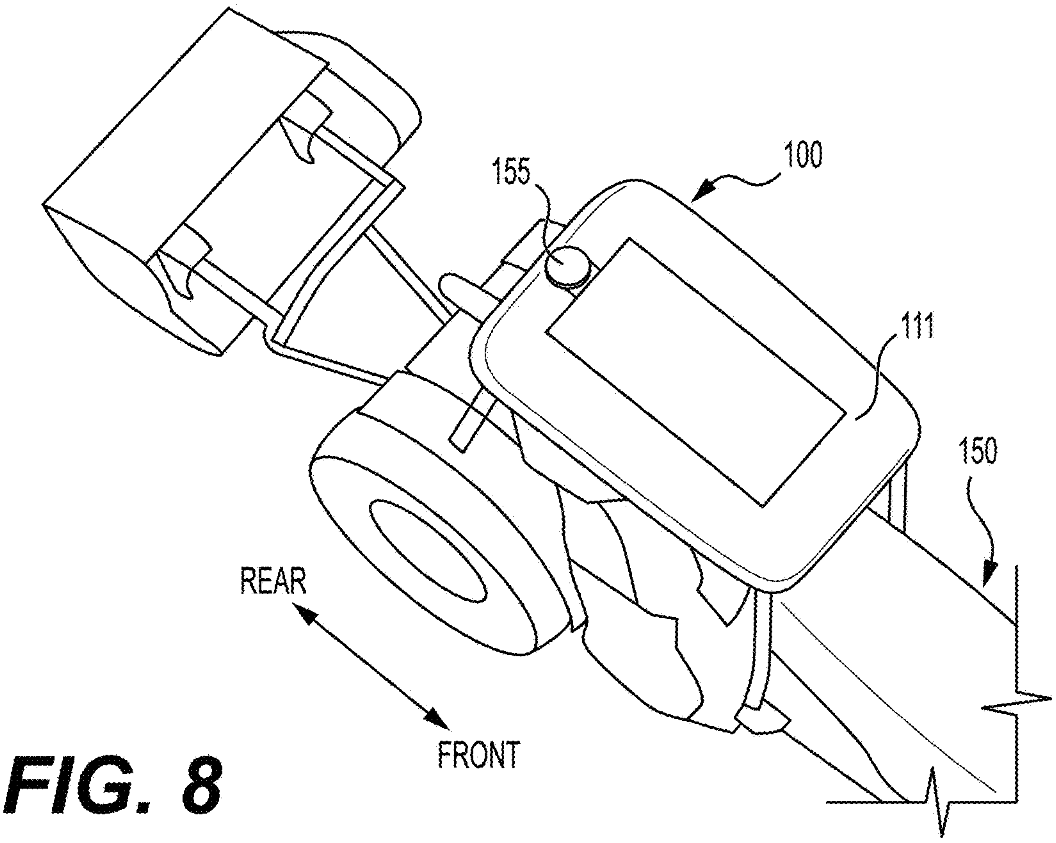

FIGS. 7 and 8 are views of the vehicle roof shown in FIGS. 1 and 2 mounted to a vehicle 150. As shown in FIG. 7, the vehicle roof 110 and the support pillars 130 define a ROPS of the vehicle 150. As shown in FIG. 8, the second end of the vehicle roof 100 can be provided at a rear portion of the vehicle 150, such that the GPS sensor 122 is located at the rear portion of the vehicle 150. Accordingly, the first end of the vehicle roof can be provided at a front portion of the vehicle 150, such that the secondary recess 111 are located at the front portion of the vehicle 150. However, the vehicle roof 100 can also be mounted on the vehicle 150 such that the GPS sensor 122 is located at the front portion of the vehicle 150 and the secondary recess 111 are located at the rear portion of the vehicle 150.

Figure 9:
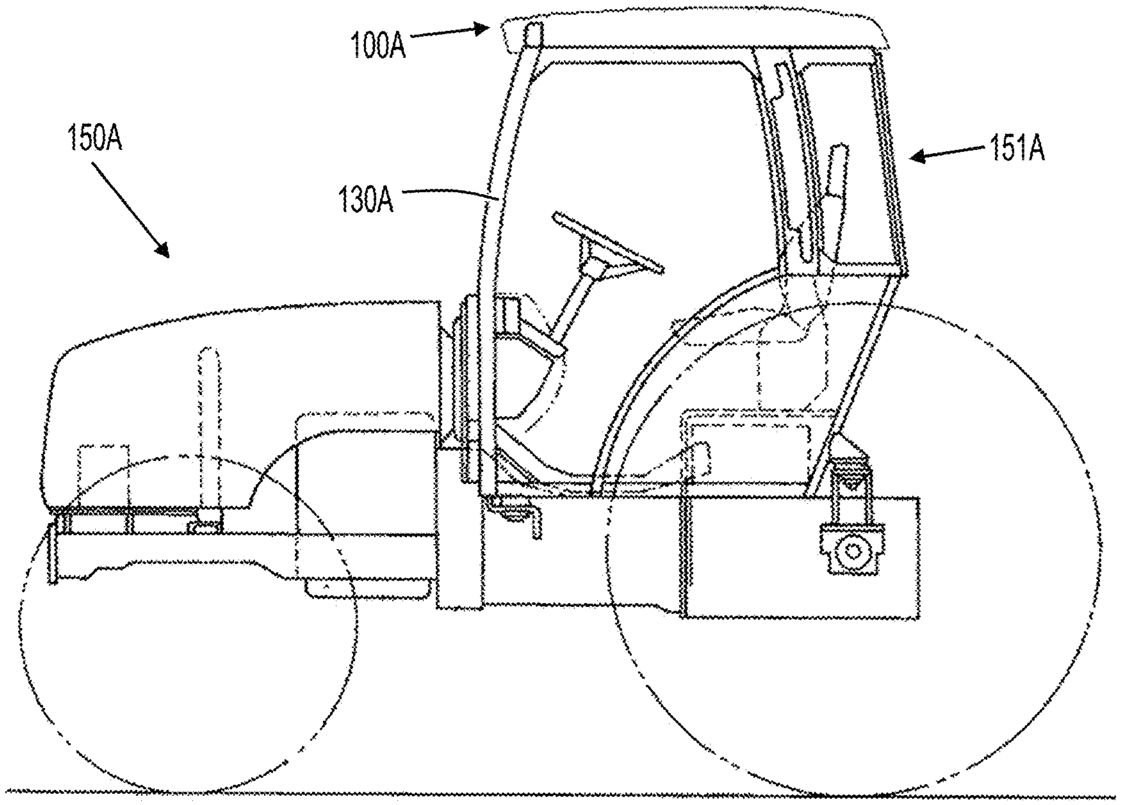
FIGS. 9 and 10 are views of a vehicle roof that is integrated with a cabin of a vehicle.
Figure 10:
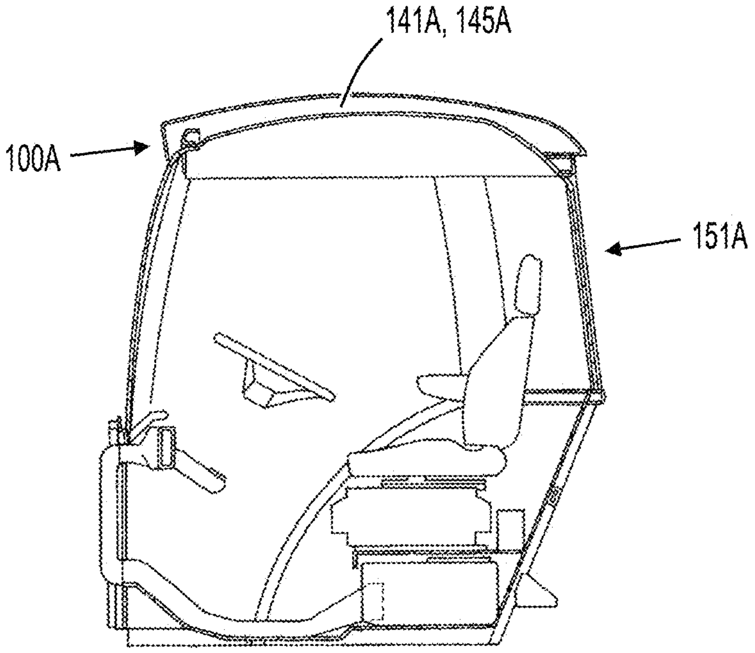

FIG. 9 is a side view of a vehicle 150A including a vehicle roof 100A that is integrated with a cabin 151A of the vehicle 150A. FIG. 10 is a cross-sectional view of the cabin 151A shown in FIG. 9. In contrast to the vehicle roof 100 shown in FIGS. 7 and 8 that is attached to support pillars 130, the vehicle roof 100A is defined by the roof of the cabin 151A of the vehicle 150A. The vehicle 150A can be similar to the vehicle described in Japanese Patent Publication No. 2006-008076A. As shown in FIG. 9, the cabin 151A can be defined by a structure similar to a cage, such that the cabin 151A includes support columns 130A that are similar to the support pillars 130 of the vehicle 150. Further, as shown in FIG. 10, the vehicle roof 100A can include an internal void space 141A or compartment 145A that can store wiring, electrical components, electrical supplies (e.g., batteries, charge controllers, power converters such as a DC-DC converter, power inverters, and/or communication devices), and the like. The vehicle roof 100A can include some or all of the features of the vehicle roof 100 described above. As an example, the vehicle roof 100A may be provided with no solar panel.

Figure 11:
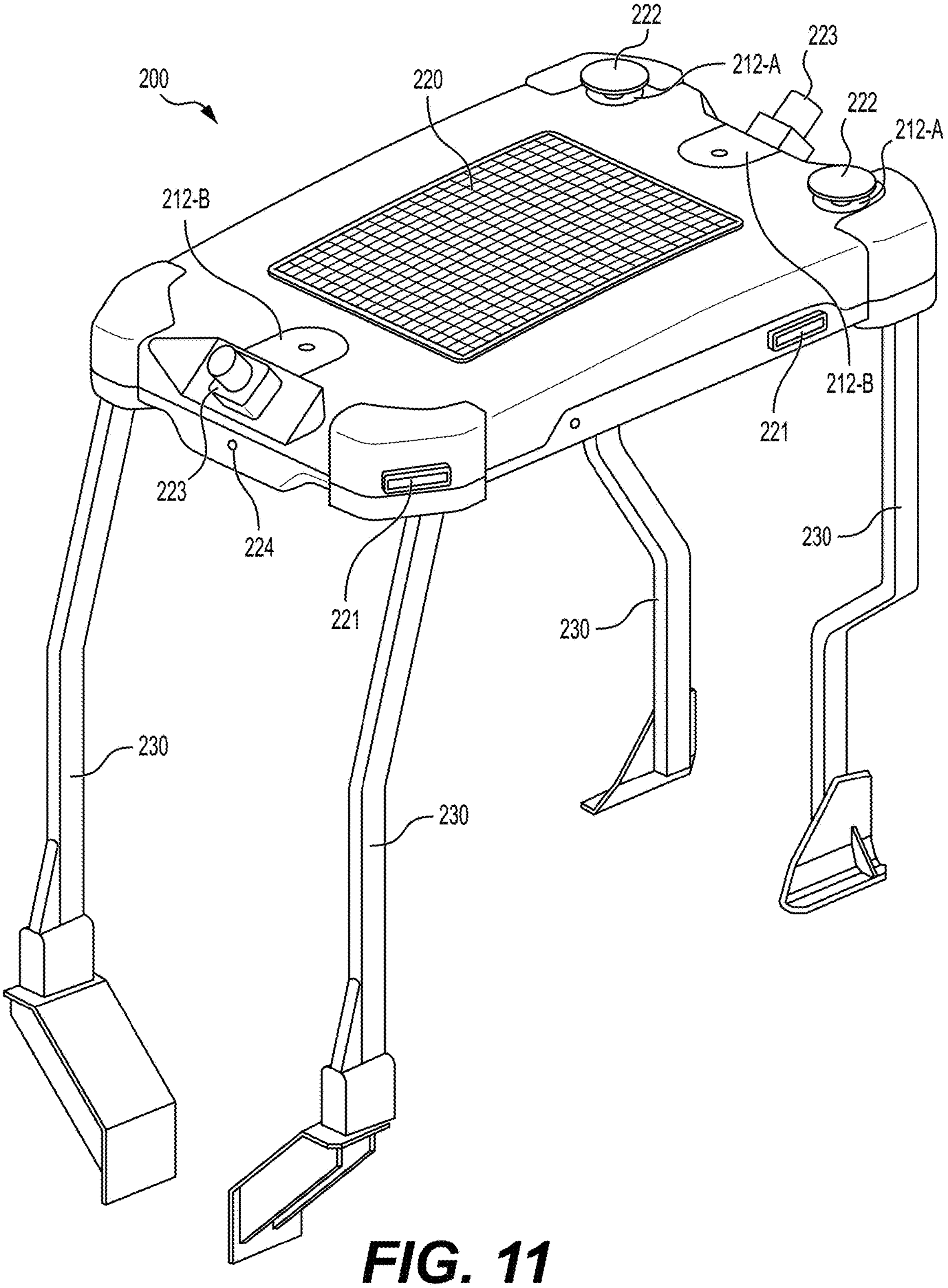
FIG. 11 is a perspective views of a vehicle roof according to another preferred embodiment of the present invention.
Figure 12:
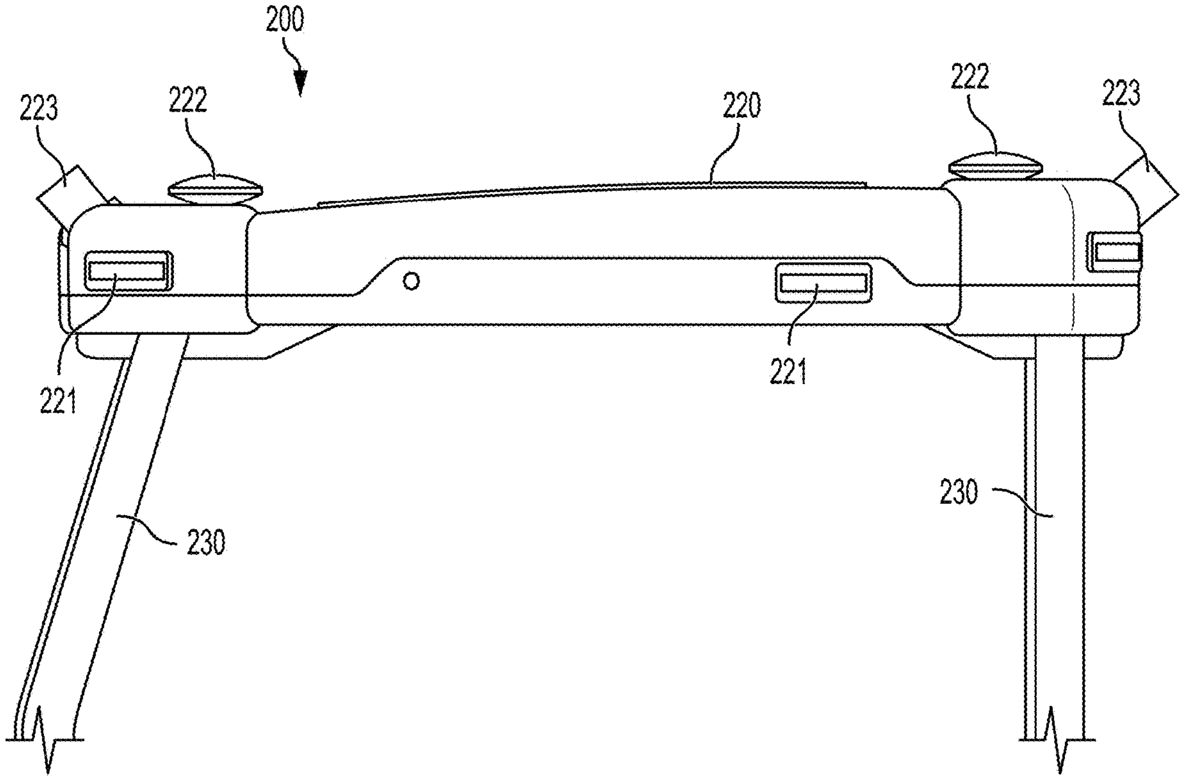
FIGS. 12 and 13 are side views of the vehicle roof shown in FIG. 11.

FIGS. 11 and 12 show a vehicle roof 200 according to another preferred embodiment of the present invention. FIG. 11 shows a view from a first end of the vehicle roof 200, and FIG. 12 shows a side view of the vehicle roof 200.

As shown in FIG. 11, the vehicle roof 200 can include a solar panel 220, one or more light sources 221, one or more GPS sensors 222, one or more LiDAR sensors 223, and one or more other sensors 224. The one or more other sensors 124 can include one or more of weather sensors, cameras, and the like. Power and/or data cables for the solar panel 220, the one or more light sources 221, the GPS sensor 222, the one or more LiDAR sensors 223, and the one or more other sensors 224 can be routed through an interior of the vehicle roof 200. The vehicle roof 200 can be attached to, or integrated with, support pillars 230, as shown in FIGS. 11 and 12. A structure including the vehicle roof 200 and the support pillars 230 can define a roll-over protection system (ROPS) for a vehicle.

FIGS. 11 and 12 show that the solar panel 220 can be provided on a main (upper) surface of the vehicle roof 200. In contrast to the solar panel 120 provided in the main recessed portion 110 of the vehicle roof 100 shown in FIGS. 1 and 2, the solar panel 220 is not provided in any recessed portion. The solar panel 220 can be a flexible solar panel that conforms to a curvature and shape of the main (upper) surface of the vehicle roof 200. As shown in FIG. 12, a portion or an entirety of the main (upper) surface of the vehicle roof 200 can be inclined, such that the solar panel 220 is also inclined. That is, the main (upper) surface of the vehicle roof 200 and the solar panel 220 can define an inclined surface with respect to ground plane in contact with wheels or treads of a vehicle that includes the vehicle roof 200.

FIGS. 11 and 12 further show that the vehicle roof 200 can also include the one or more light sources 221, and the light sources 221 can be provided in or on side surfaces of the vehicle roof 200. The main (upper) surface of vehicle roof 200 can also include one or more GPS sensors, such as GPS sensors 222 shown in FIG. 11. The GPS sensors 222 can also be provided in second GPS recesses 212-B, as described below with respect to FIGS. 17A and 17B.

Figure 13:
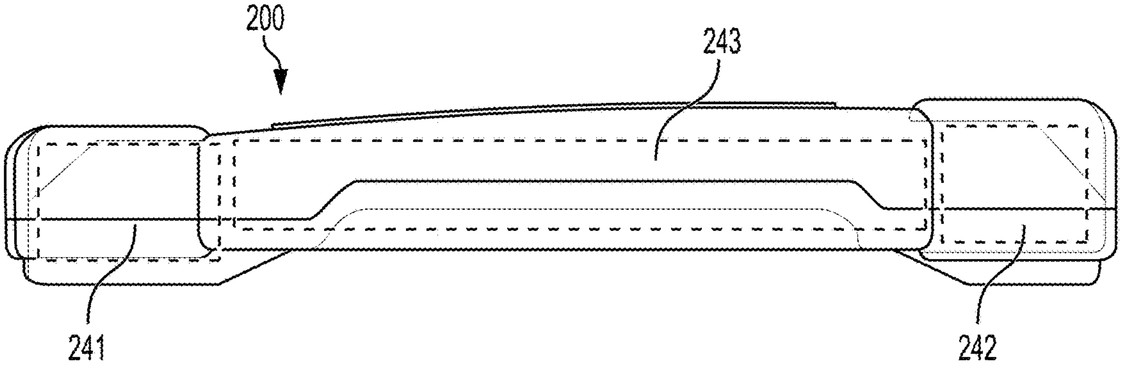

FIG. 13 is a side view of the vehicle roof 200 showing an approximate interior space of the vehicle roof 200. As shown in FIG. 13, an interior of the vehicle roof 200 includes a first void space 241, a second void space 242, and a central void space 243. Each of the void space 241, the second void space 242, and the central void space 243 can store wiring, electrical components, electrical supplies (e.g., batteries, charge controllers, power inverters, communication devices), and the like. The central void space 243 is at least partially provided by not including a recess in the vehicle roof 200 for the solar panel 220. In addition, the central void space 243 can be increased in size by not including a recess for a cabin of a vehicle on which the vehicle roof 200 is mounted. By providing the central void space 243 in the vehicle roof 200 shown in FIGS. 11-13, additional components can be located in the interior of the vehicle roof 200 when compared to the vehicle roof 100 shown in FIGS. 1-4.

Figure 14:
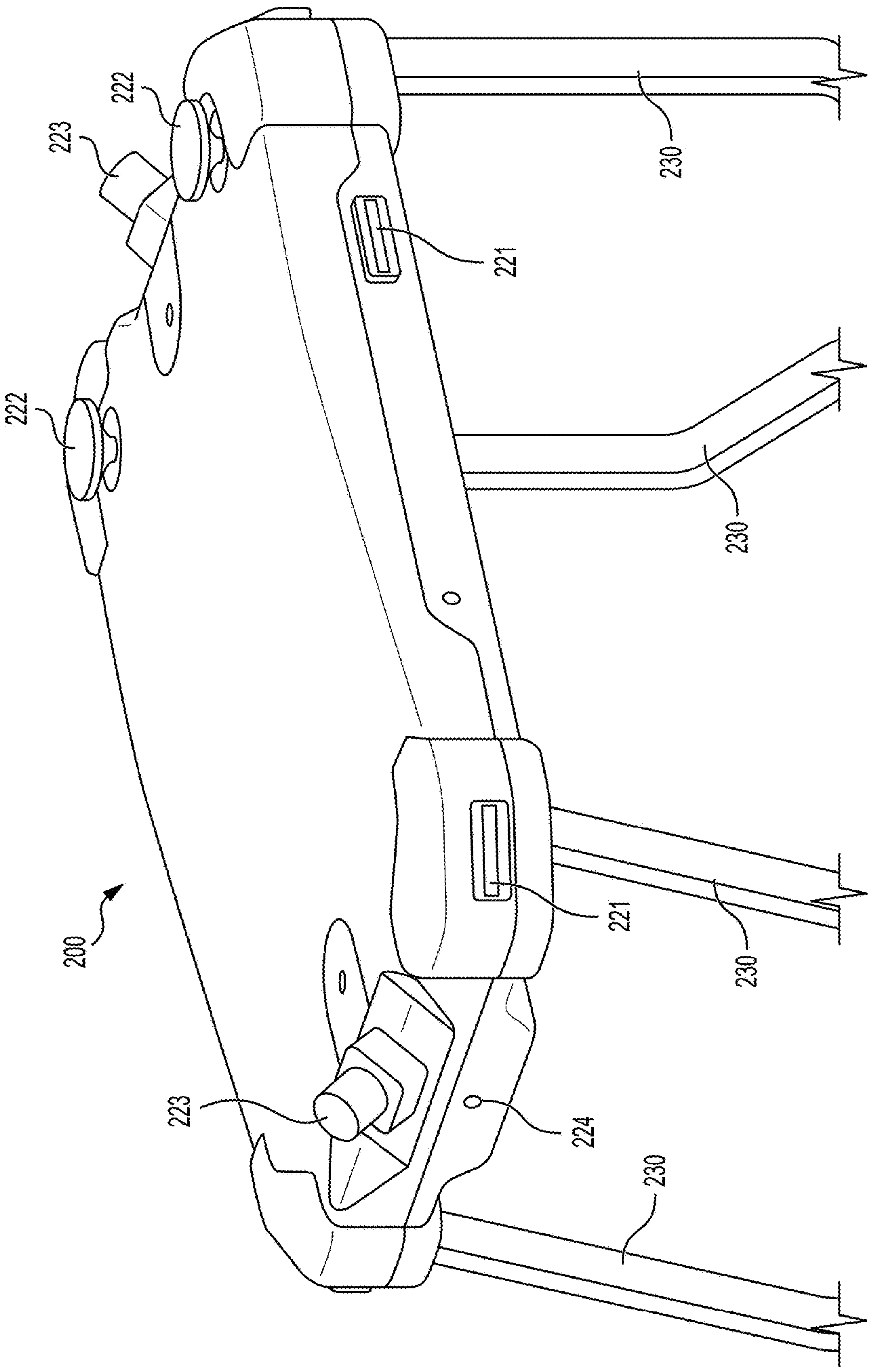
FIGS. 14 and 15 are partially translucent top views of the vehicle roof shown in FIG. 11.
Figure 15:
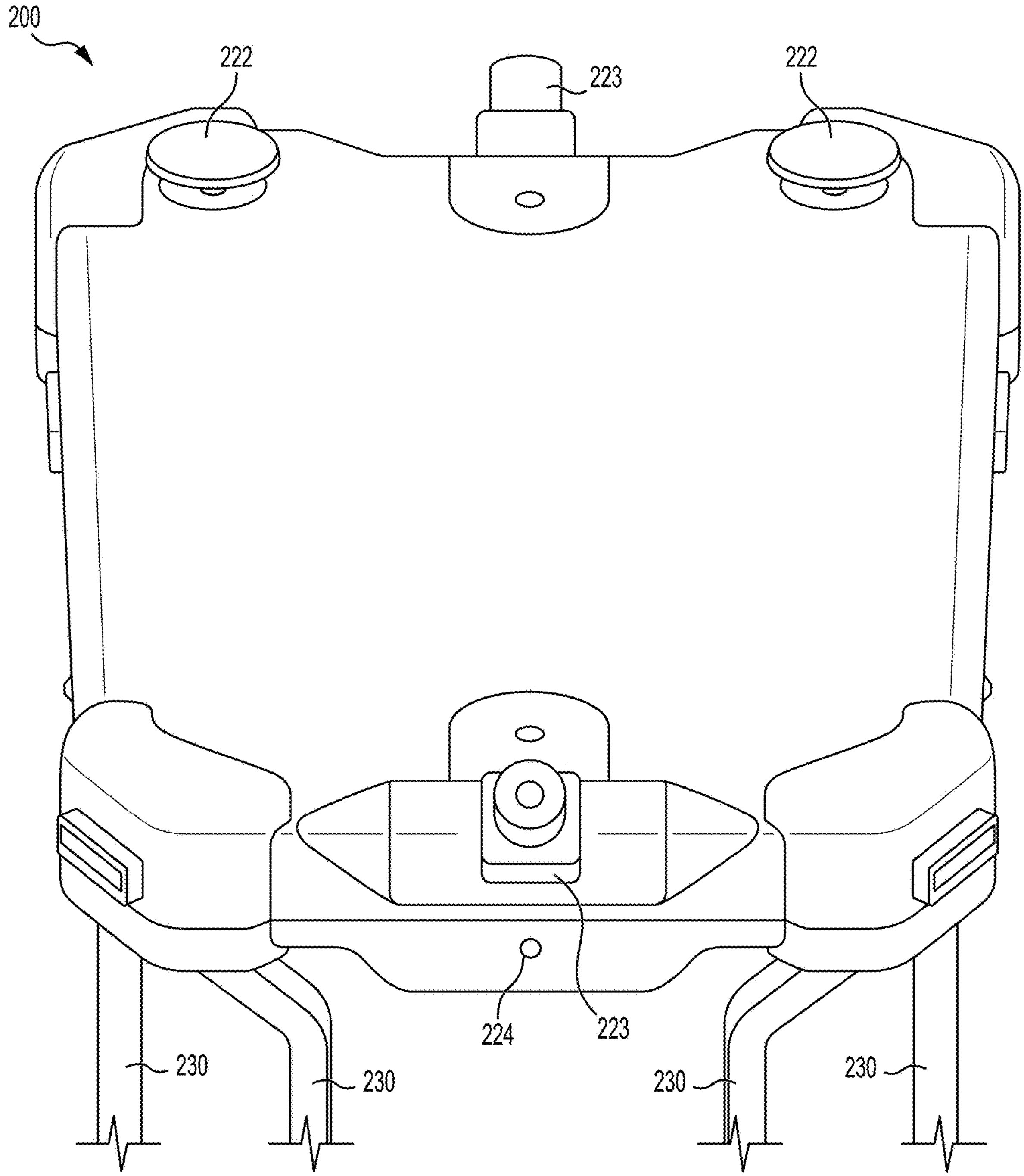

FIGS. 14 and 15 are partially translucent top views of the vehicle roof 200 to further illustrate the interior space of the vehicle roof 200.

Figure 16:
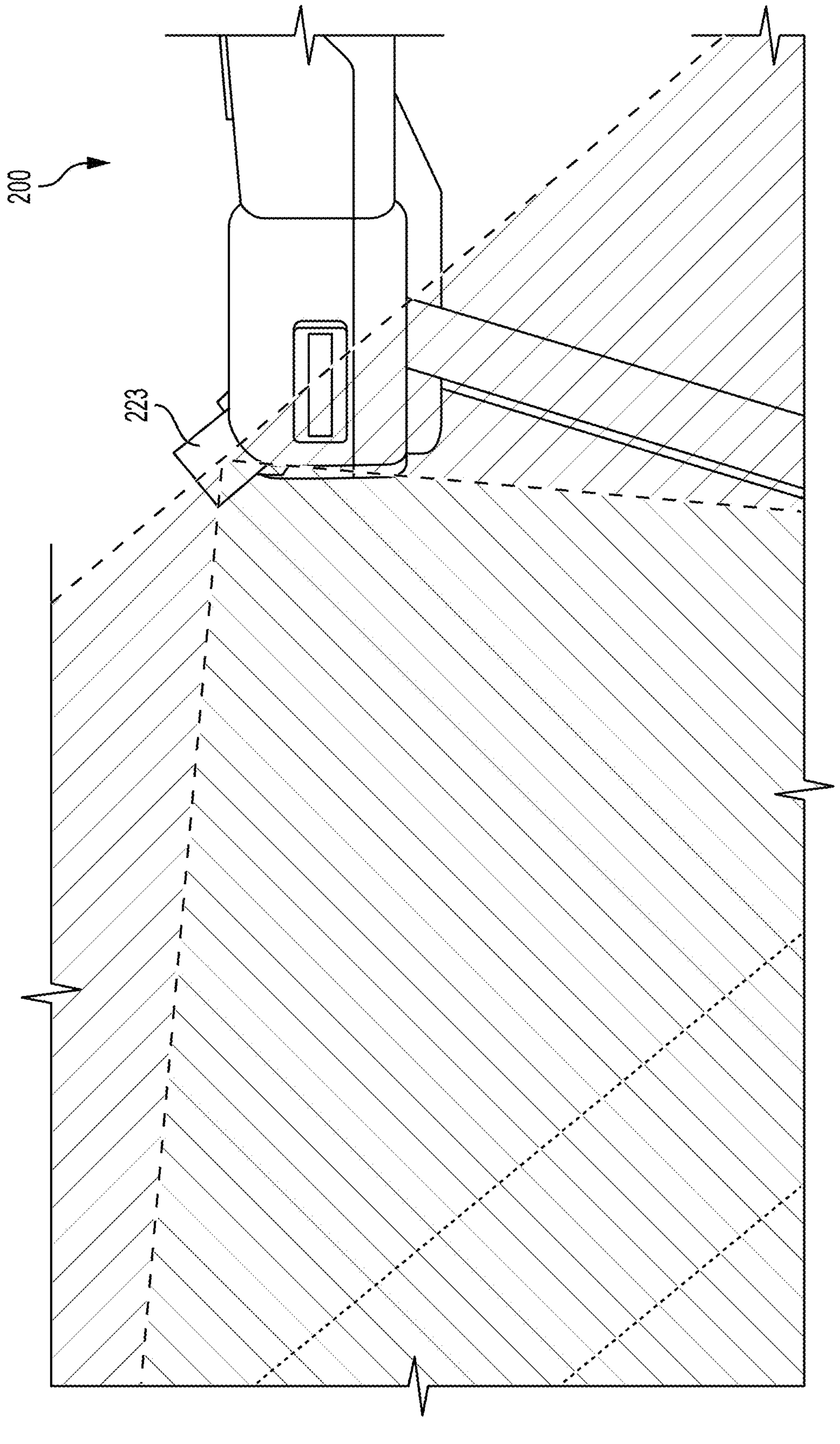
FIG. 16 shows an example of possible detection angles of a LiDAR sensor provided on the vehicle roof shown in FIG. 11.

As shown in FIGS. 11, 12, 14, and 15 one or more LiDAR sensors 223 can be provided on the vehicle roof 200. The LiDAR sensors 223 can be inclined with respect to the main (upper) surface of the vehicle roof 220. Preferably, for example, the LiDAR sensors 223 are adjustable and can each include an adjustable mounting base. Accordingly, the LiDAR sensors 223 can be adjusted to optimize a LiDAR angle for any particular implementation or use of the vehicle roof 200. For example, the LiDAR sensors 223 can be set to an angle of about 40 degrees, and/or can have an ultra-wide field-of-view. FIG. 16 shows an example of possible detection angles provided by one of the LiDAR sensors 223.

Figure 17B:
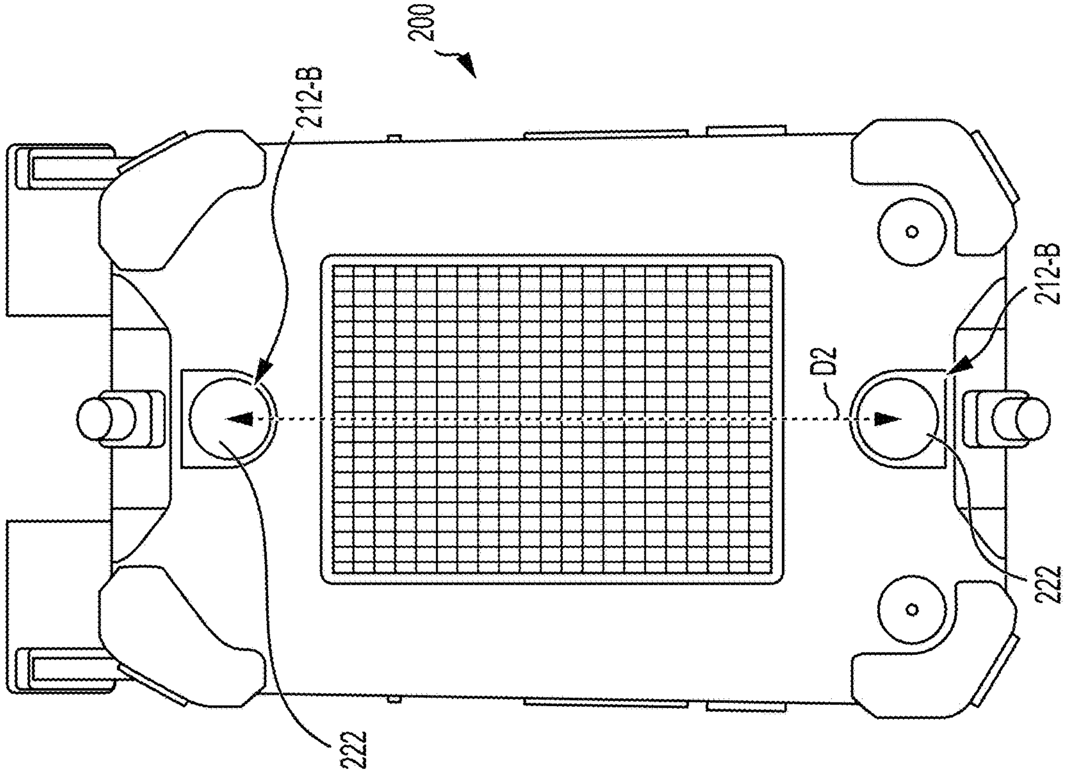
FIGS. 17A and 17B show GPS mounting arrangements for the vehicle roof shown in FIG. 11.
Figure 17A:
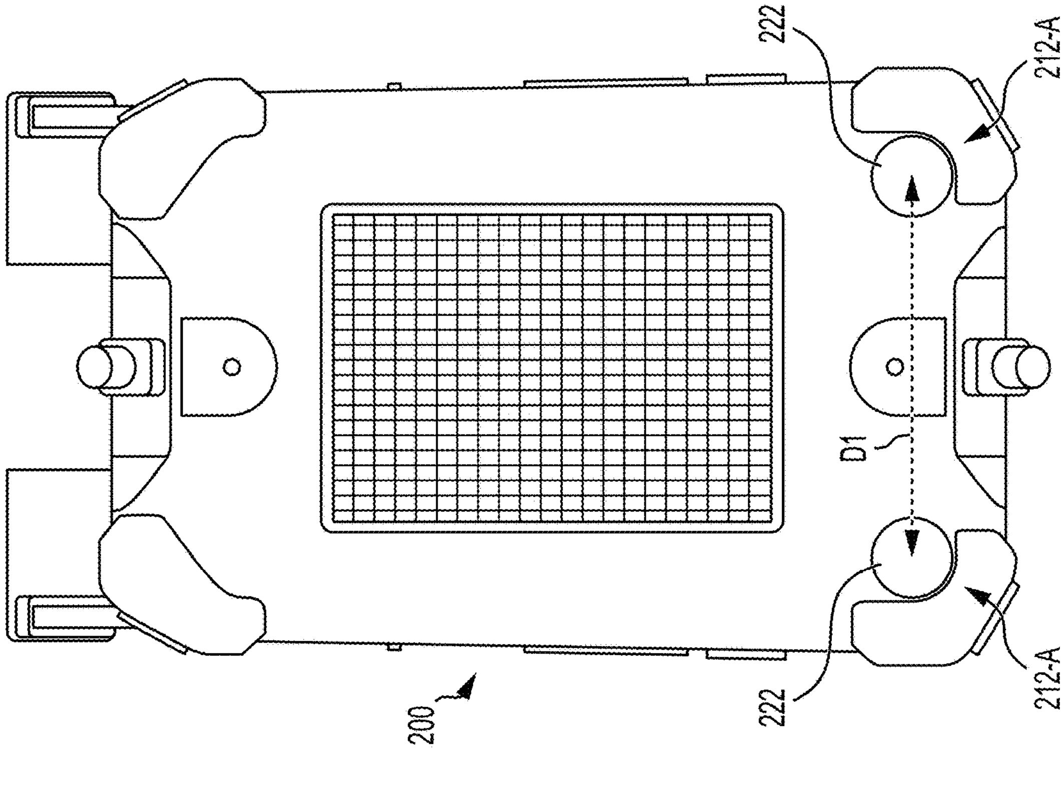

FIGS. 17A and 17B show GPS mounting arrangements for the vehicle roof 200. As shown in FIG. 17A, in one arrangement, the GPS sensors 222 can be provided in the first GPS recesses 212-A that are located at the second end of the vehicle roof 200 and are spaced apart from each other in a width direction of the vehicle. As an example, a center-to-center distance D1 between the first GPS recesses 212-A can be about 27 inches. As shown in FIG. 17B, in another arrangement, the GPS sensors 222 can be provided in the second GPS recesses 212-B that are located at the opposing first and second ends of the vehicle roof 200. As an example, a center-to-center distance D2 between the second GPS recesses 212-B can be about 48 inches.

Figure 18:
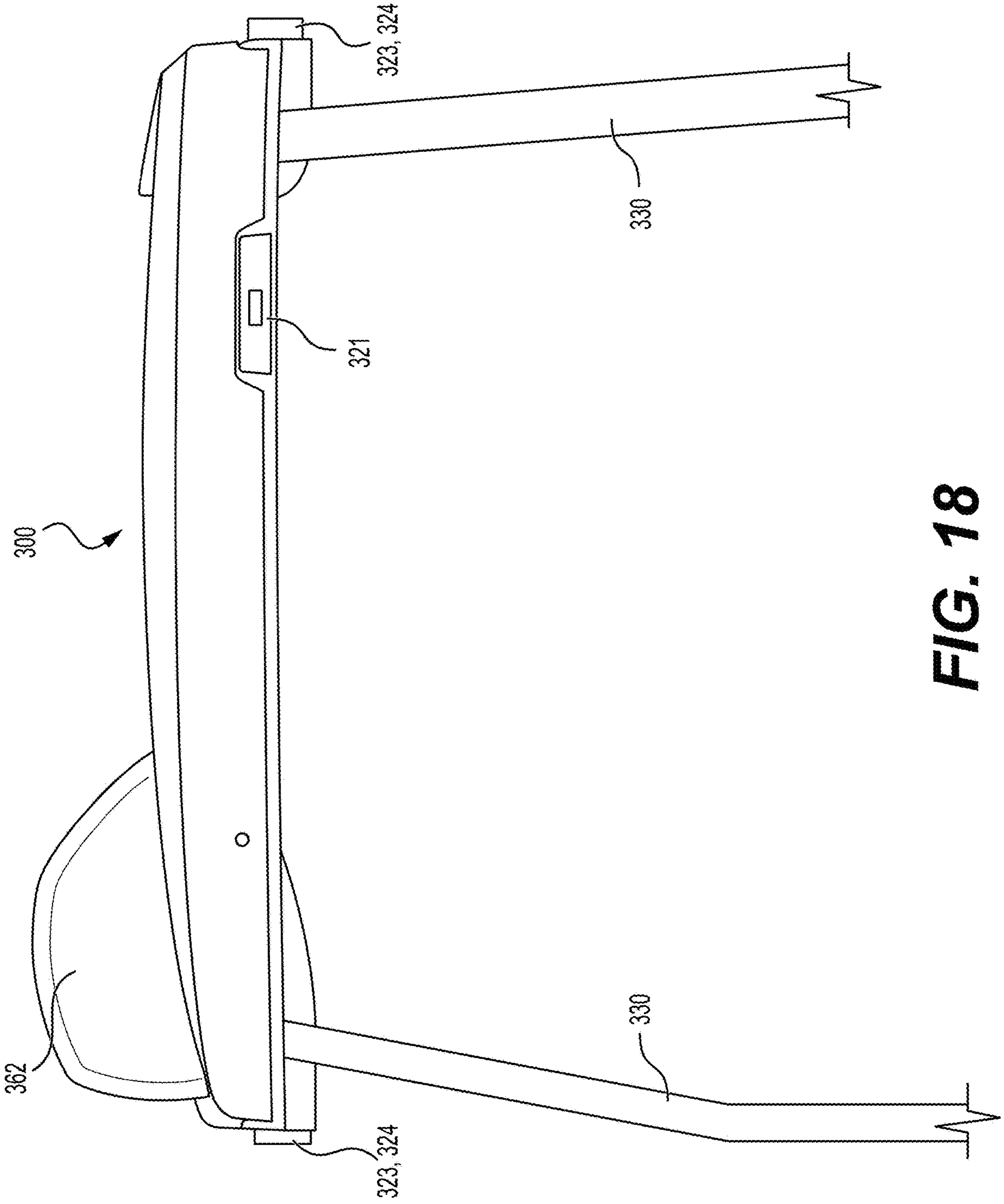
FIG. 18 is a side view of a vehicle roof including a heat dissipation structure according to a further embodiment of the present invention.
Figure 19A:
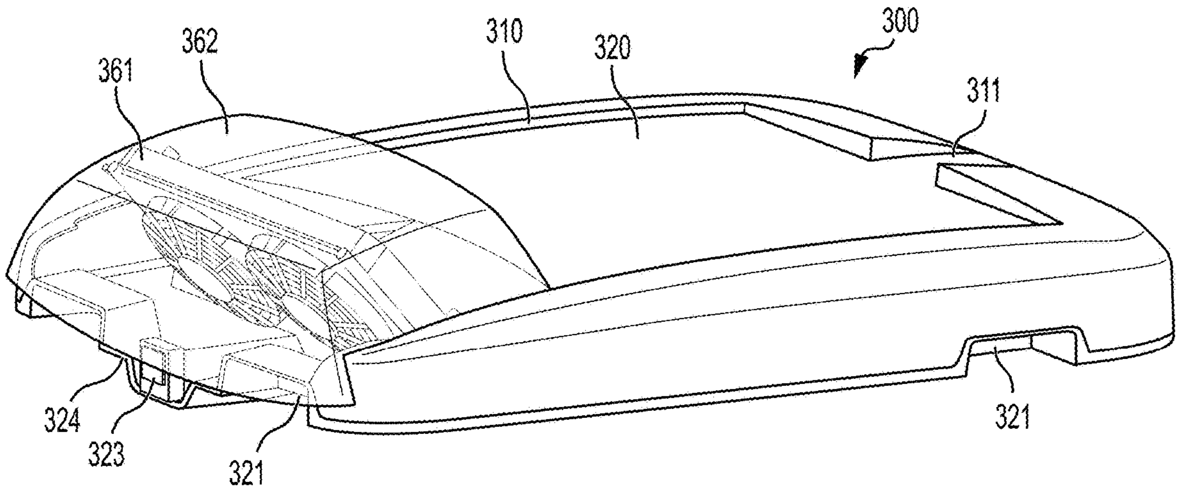
FIGS. 19A and 19B are partially translucent perspective views of the vehicle roof shown in FIG. 18.
Figure 19B:
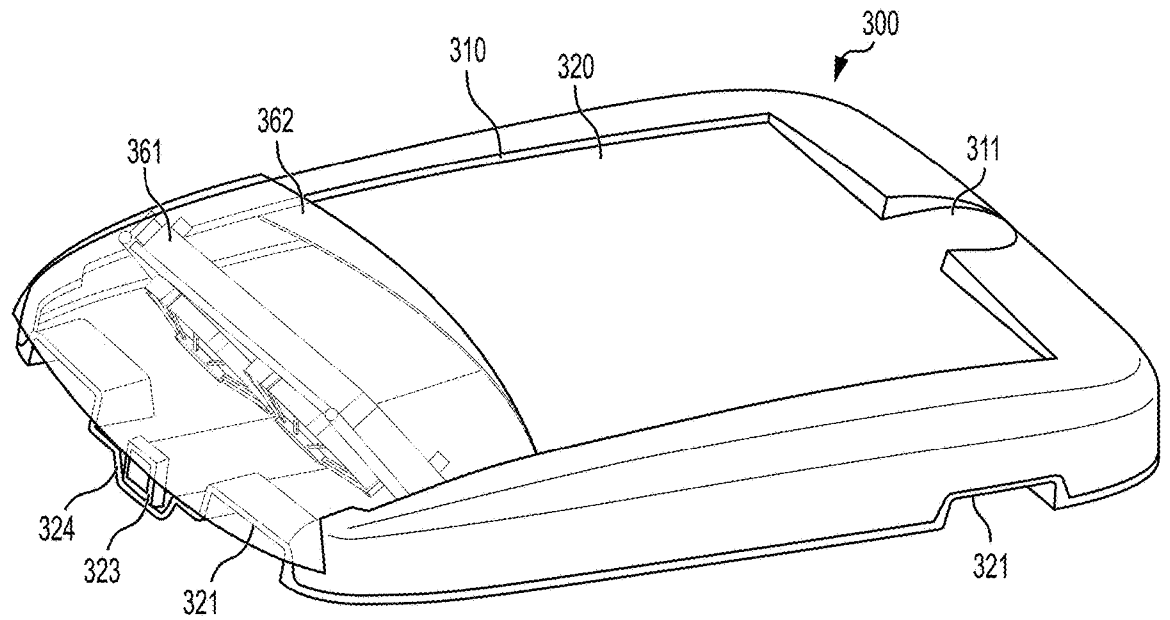
Figure 20:
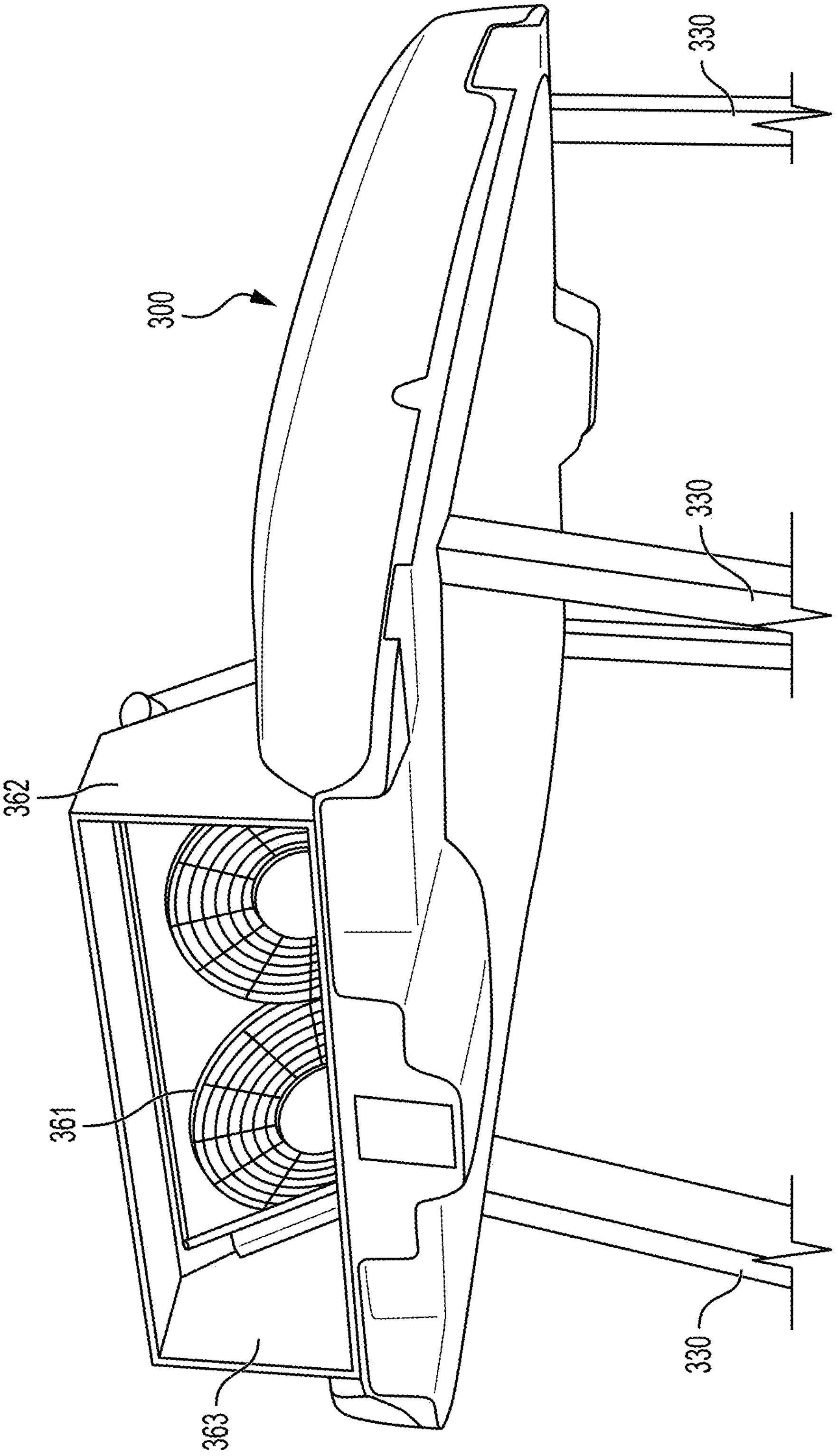
FIG. 20 shows an example of an implementation of the vehicle roof shown in FIG. 18.

FIG. 18 is a side view of vehicle roof 300 according to a further embodiment of the present invention. FIGS. 19A and 19B are partially translucent top views of the vehicle roof 300 shown in FIG. 18. FIG. 20 shows an example of an implementation of the vehicle roof shown in FIG. 18.

As shown in FIGS. 18, 19A, and 19B, the vehicle roof 300 can include a solar panel 320, one or more light sources 321, and one or more sensors 323 and 324. The one or more sensors 323 and 324 can include one or more of a LiDAR (light detection and ranging) sensor, a weather sensor, a camera, and the like. The vehicle roof 300 can also include a GPS sensor, similar to the vehicle roof 100 and the vehicle roof 200 described above. Power and/or data cables for the solar panel 320, the one or more light sources 321, the one or more sensors 323 and 324, and the GPS sensor can be routed through an interior of the vehicle roof 300. The vehicle roof 300 can be attached to, or integrated with, support pillars 330, as shown in FIGS. 18 and 20. A structure including the vehicle roof 300 and the support pillars 330 can define a roll-over protection system (ROPS) for a vehicle.

FIG. 18 shows that the vehicle roof 300 includes a housing 362 that extends from a main (upper) surface of the vehicle roof 300 at a first end of the vehicle roof 300, and FIGS. 19A and 19B show a translucent view of the housing 362. As shown in FIGS. 19A and 19B, the housing 362 can include a radiator and condenser module 361 (e.g., a heat dissipation structure). The housing 362 can include an opening at an end of the housing 362 closest to the first end of the vehicle roof 300 to expose the radiator and condenser module 361 to ambient air. The opening can be completely open or can include a grill or the like to prevent objects from coming into physical contact with the radiator and condenser module 361.

FIG. 20 shows an example of an implementation of the vehicle roof 300 including the radiator and condenser module 361 and the housing 362, with an opening 363 provided in the housing 362. The radiator and condenser module 361 can provide cooling for electronic components of the vehicle including components included in the vehicle roof and/or provide heat dissipation for an air conditioning apparatus of a vehicle upon which the vehicle roof 300 is mounted. The radiator and condenser module 361 can be connected to one or more of hosing, tubing, and/or power or data cables that extend through the support pillars 330 to connect the radiator and condenser module 361 to one or more other components located on or within a main body of the vehicle.

By providing the radiator and condenser module 361 and the housing 362 at the first end of the vehicle roof 300, which can correspond to a front end of a vehicle upon which the vehicle roof 300 is mounted, air can be forced into the housing 362 and the radiator and condenser module 361 as the vehicle moves. In addition, if the vehicle is a combustion-driven vehicle, the radiator and condenser module 361 and the housing 362 can also be provided forward of an exhaust outlet of the vehicle.

In a preferred embodiment, the radiator and condenser module 361 can be angled with respect to an up-down direction of the vehicle. For example, as shown in FIGS. 19A and 19B, the radiator and condenser module 361 can be tilted forward at an angle of approximately 45 degrees. The angle at which the radiator and condenser module 361 is tilted forward can be adjustable, and can include an angle between 0 degrees and 90 degrees, for example.

However, the angle at which the radiator and condenser module 361 is titled forward is preferably between about 30 degrees and about 60 degrees.

The vehicle roof 300 is not limited to including a radiator and condenser module 361 that includes both a radiator and a condenser. For example, only one of a radiator and a condenser may define a heat dissipation structure of the vehicle roof 300.

FIGS. 19A and 19B show that the main (upper) surface of the vehicle roof 300 can include a main recessed portion 310, and the solar panel 320 can be provided within the main recessed portion 310. As shown in FIG. 19A, one or more secondary recesses 311 can extend from the main recessed portion 310 toward a second end of the vehicle roof 300. The solar panel 320 may or may not extend into the secondary recess 311, and/or a GPS sensor may be located in the secondary recess 311. GPS sensor(s) can also be provided at other locations on the vehicle roof 300, for example, on the housing 362.

However, the vehicle roof 300 is not limited to including the solar panel 320 within the main recessed portion 310, and may instead include a solar panel that is not provided in a recessed portion, similar to the solar panel 220 shown in FIGS. 11 and 12. The vehicle roof 300 may also be provided with no solar panel.

Figure 21:
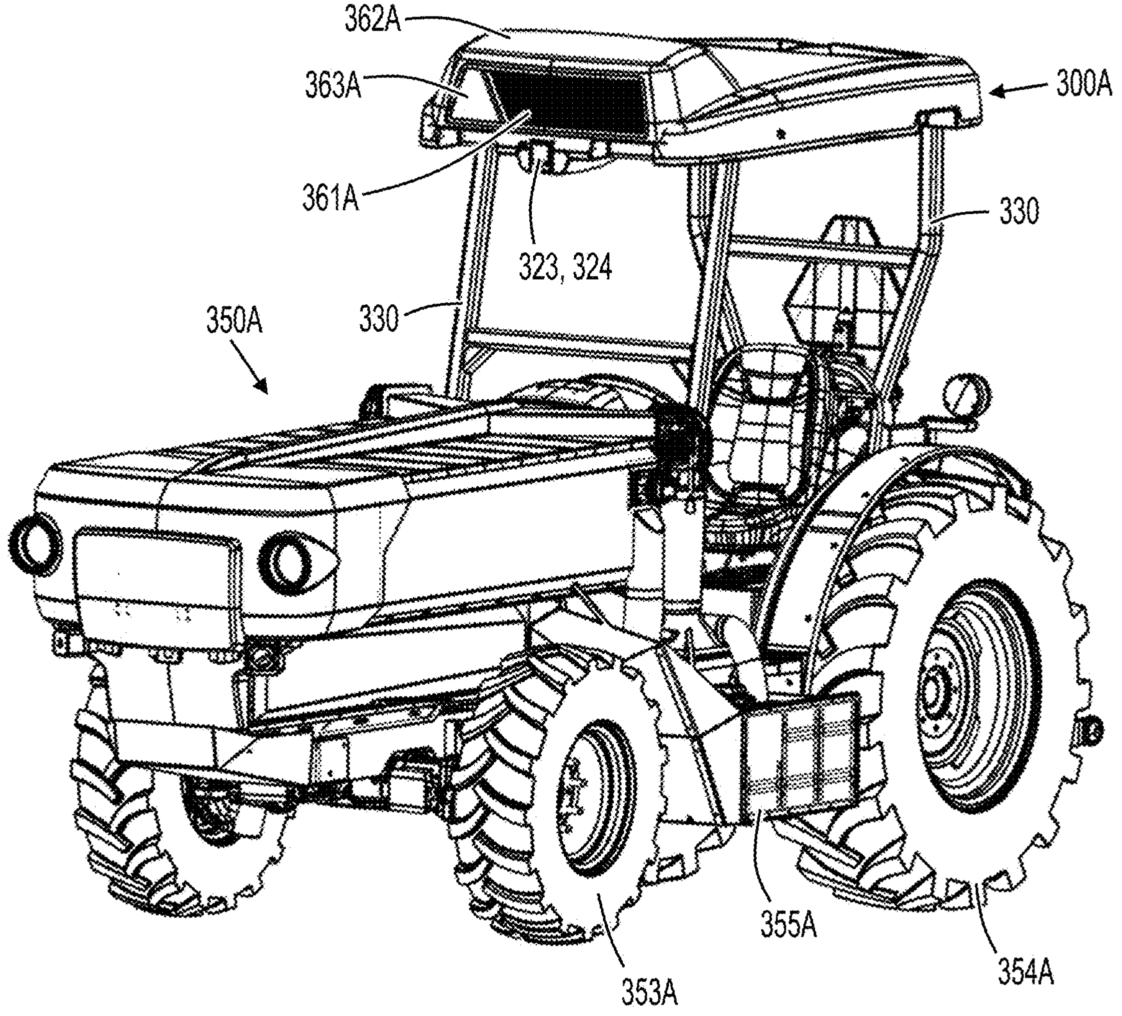
FIGS. 21-24 are views of another vehicle roof including a heat dissipation structure.
Figure 22:
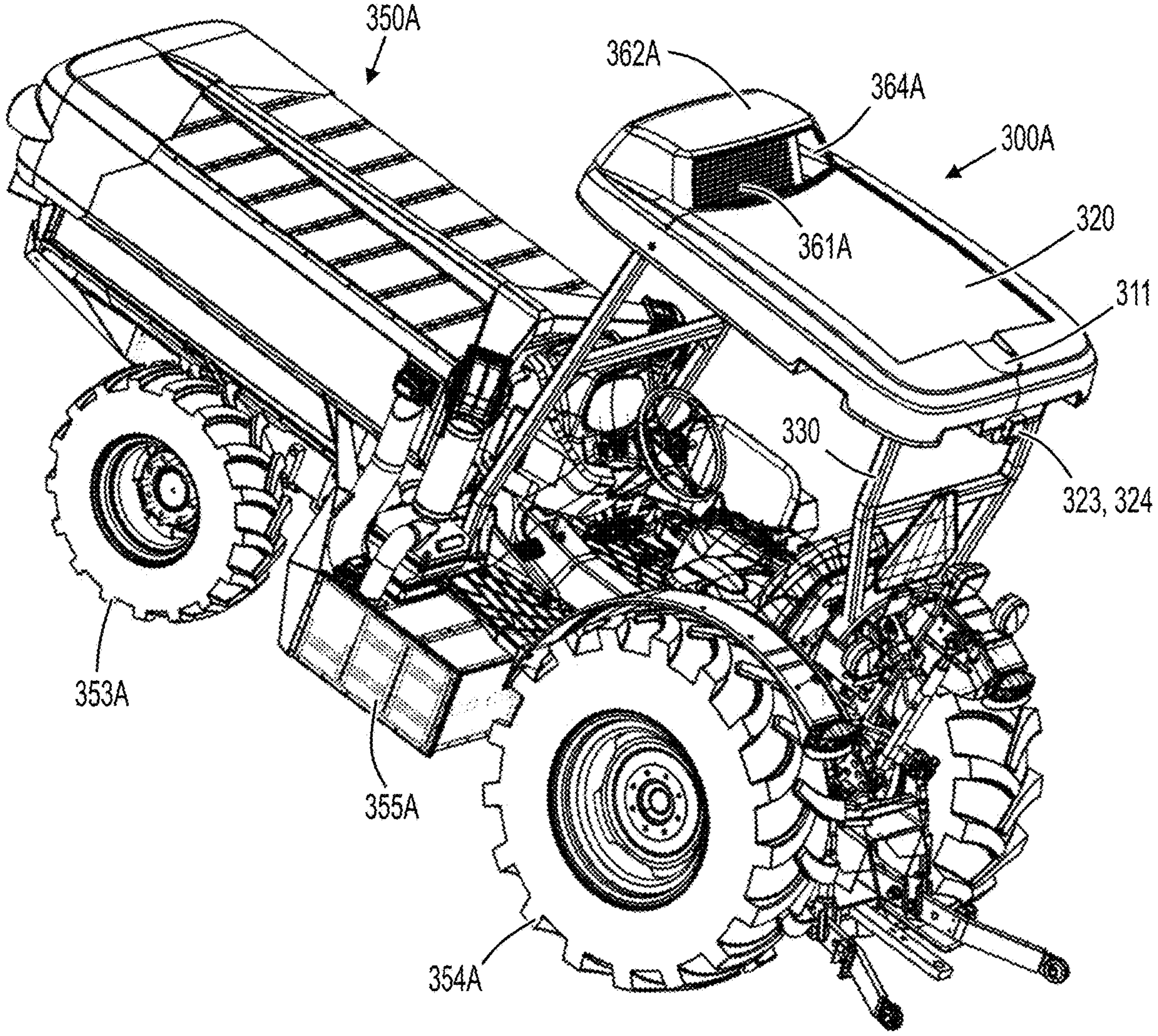
Figure 23:
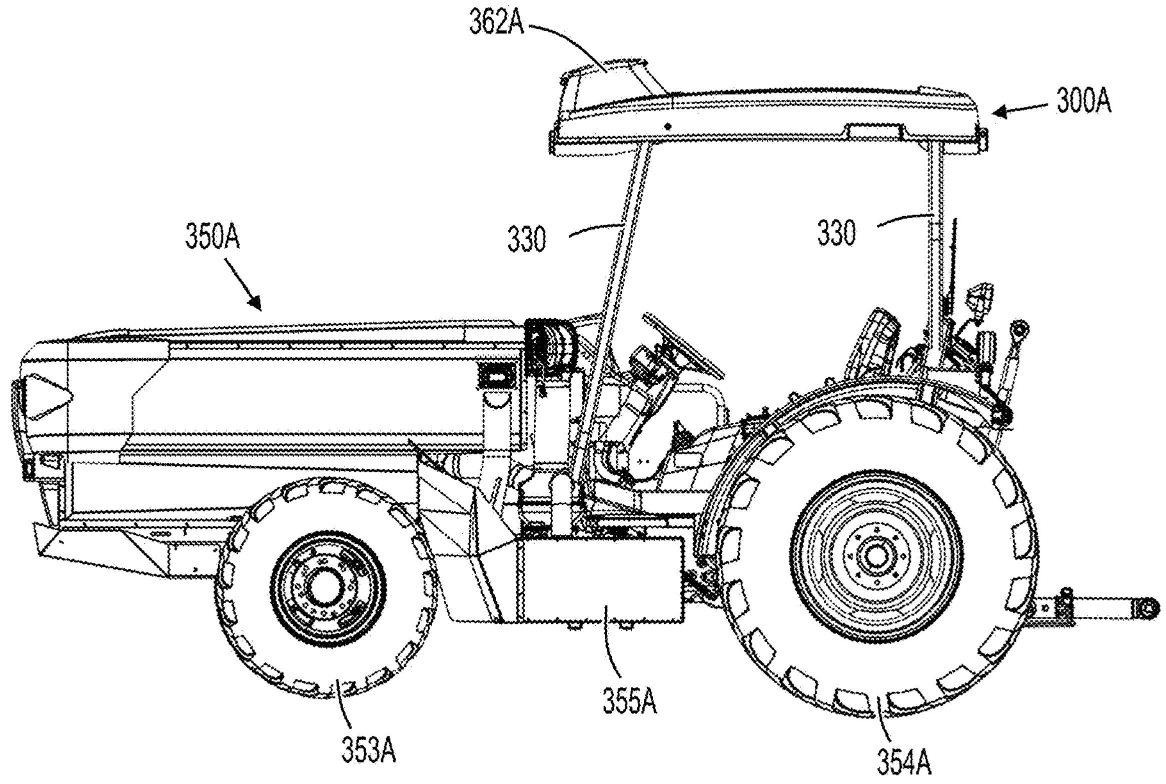
Figure 24:
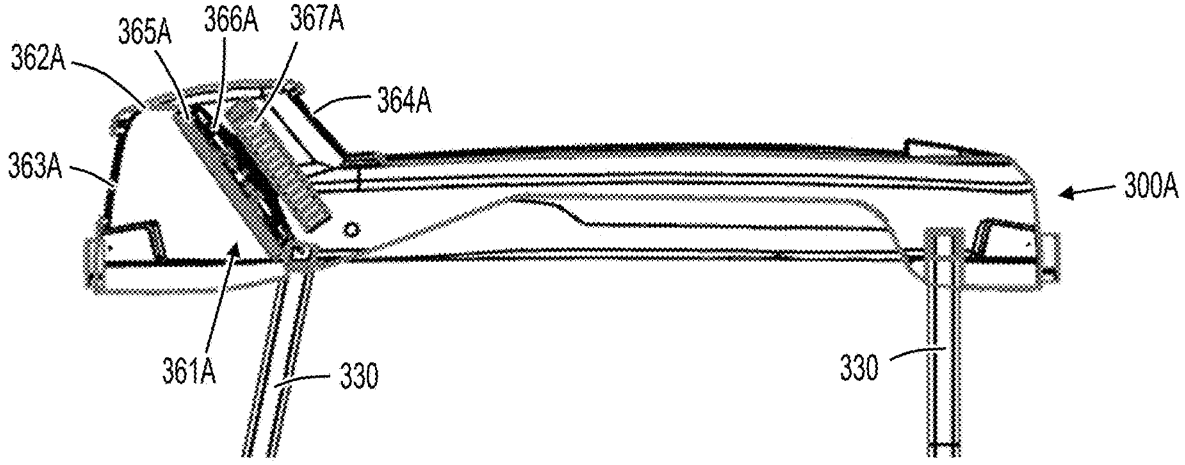

FIGS. 21-23 are perspective and side views of a vehicle 350A including a vehicle roof 300A. FIG. 24 is a side cross-sectional view of the vehicle roof 300A. The vehicle roof 300A includes features similar to the vehicle roof 300 shown in FIG. 18, except for the features explained below.

As shown in FIGS. 21-24, the vehicle roof 300A includes a housing 362A that extends from a main (upper) surface of the vehicle roof 300A at a first end of the vehicle roof 300A. The housing 362 can include a radiator and condenser module 361A (e.g., a heat dissipation structure). The housing 362A can include a first opening 363A at an end of the housing 362A closest to the first end of the vehicle roof 300A and a second opening 364A at an end of the housing 362A closest to a second end of the vehicle roof 300A to expose the radiator and condenser module 361A to ambient air. The first opening 363A can be completely open or can include a grill or the like to prevent objects from coming into physical contact with the radiator and condenser module 361A.

Figure 25:
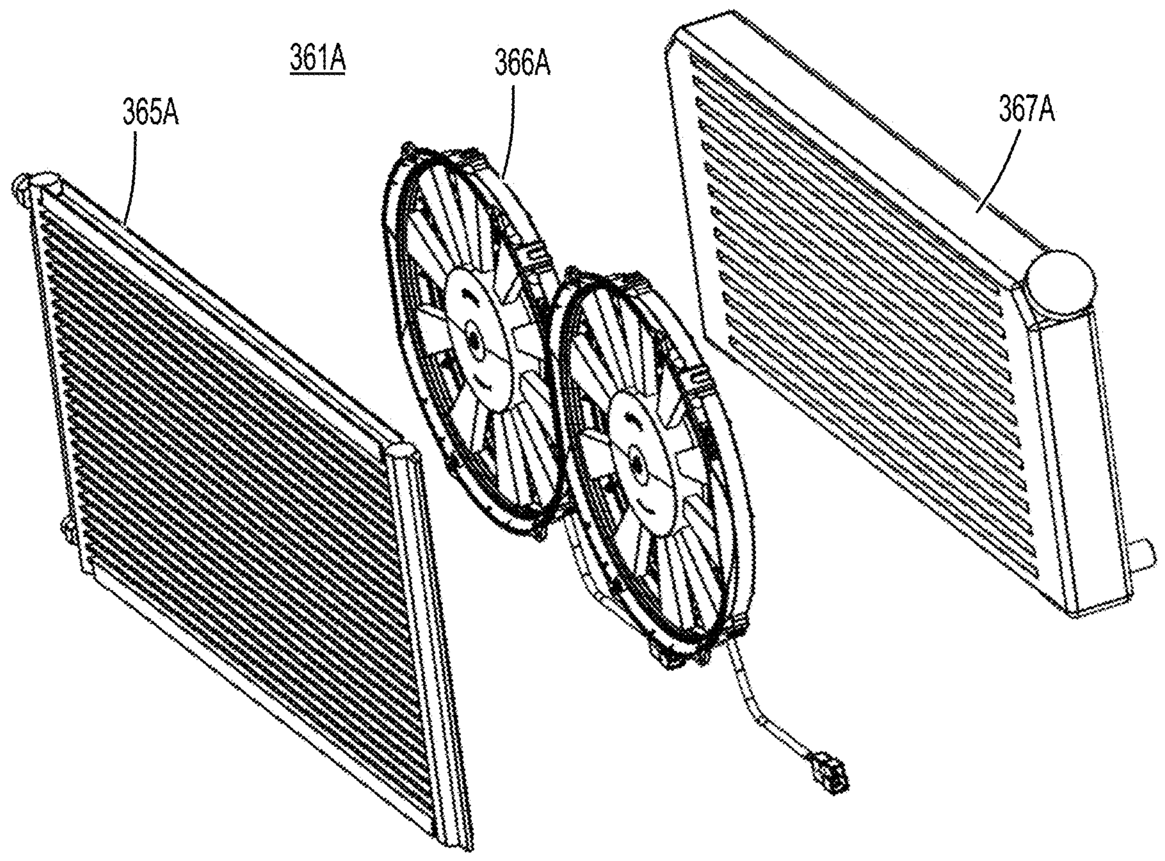
FIG. 25 is an exploded view of the heat dissipation structure shown in FIGS. 21-24.

FIG. 25 is an exploded view of the radiator and condenser module 361A shown in FIGS. 21-24. As shown in FIGS. 24 and 25, the radiator and condenser module 361A includes a condenser 365A, a group of one or more fans 366A, and a radiator 367A. The one or more fans 366A are located between the condenser 365A and the radiator 367A.

As shown in FIGS. 21-23, the vehicle 300A can include one or more side batteries 355A that is located at a bottom portion of the vehicle 300A and positioned between front wheels 353A and rear wheels 354A of the vehicle 300A.

The vehicle roof 300A is not limited to including a radiator and condenser module 361A that includes both the radiator 367A and a condenser 365A. For example, only one of the radiator 367A and the condenser 365A may be included to define a heat dissipation structure of the vehicle roof 300A.

Figure 26:
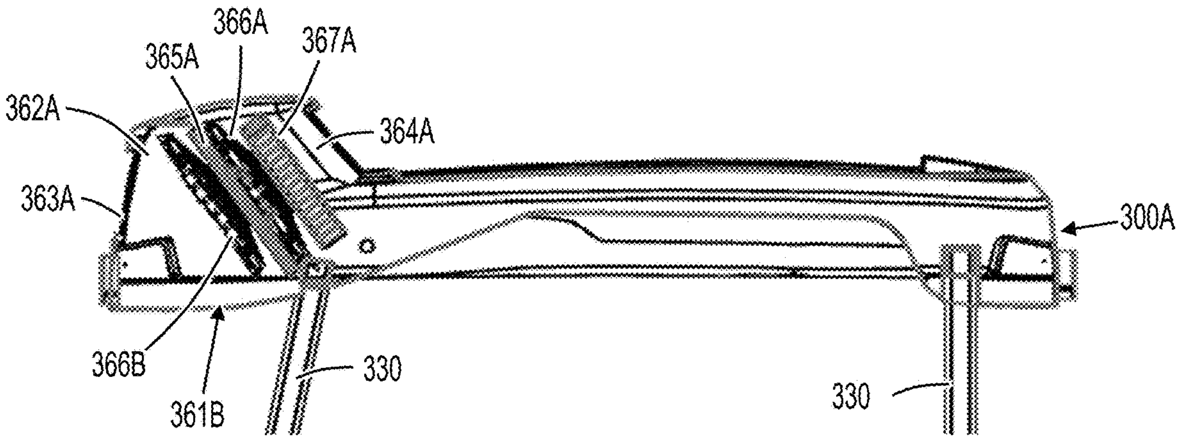
FIGS. 26 and 27 show modifications to the heat dissipation structure shown in FIGS. 21-25.
Figure 27:
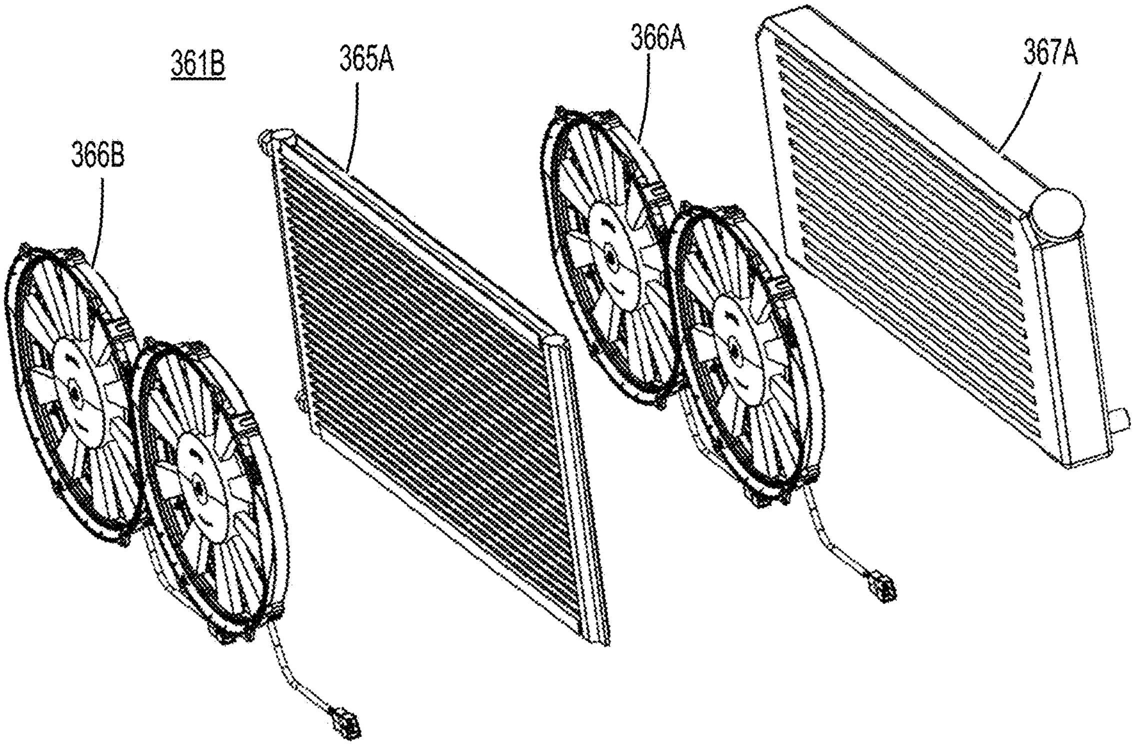

FIGS. 26 and 27 show a modification to the radiator and condenser module 361A shown in FIGS. 21-25. FIG. 26 is a side cross-sectional view of the vehicle roof 300A with a modified radiator and condenser module 361B, and FIG. 27 is an exploded view of the modified radiator and condenser module 361B. As shown in FIGS. 26 and 27, the modified radiator and condenser module 361B includes features similar to the features of the radiator and condenser module 361A. However, in addition to the group of one or more fans 366A located between the condenser 365A and the radiator 367A, the modified radiator and condenser module 361B includes a further group of one or more fans 366B that are located between the condenser 365A and the first opening 363A.

According to the preferred embodiments of the present invention, GPS sensors can be located on an uppermost portion of a vehicle. For example, as described above, GPS sensors 122 and 222 are respectively located on the main (upper) surface of the vehicle roofs 100 and 200. Similarly, one or more GPS sensors can be located on the main (upper) surface of the vehicle roof 100A, the vehicle roof 300, and the vehicle roof 300A. Accordingly, by providing GPS sensors on the uppermost portion of the vehicle, sensitivity of the GPS sensors to receive radio waves from satellites can be increased.

In addition, the preferred embodiments of the present invention provide GPS sensors that are on, or substantially symmetrical about, longitudinal and/or lateral centerlines of a vehicle. For example, the GPS sensor 122 is located on a longitudinal centerline of the vehicle roof 100, and can be also located at a position corresponding to a lateral centerline of a vehicle on which the vehicle roof 100 is mounted. As another example, the GPS sensors 222 can be located substantially symmetrically about a longitudinal centerline of the vehicle roof in the first GPS recesses 212-A or on a longitudinal centerline of the vehicle roof in the second GPS recesses 212-B, and the GPS sensors 222 can be selectively positioned in the first GPS recesses 212-A and/or in the second GPS recesses 212-B to be located at a position corresponding to a lateral centerline of a vehicle on which the vehicle roof 200 is mounted. GPS sensors located on the vehicle roof 300 can be positioned similar to the locations of the GPS sensors 122 and/or 222. Accordingly, accuracy of the GPS sensors in detecting a vehicle position can be significantly increased.

In another implementation according to the preferred embodiments of the present invention, GPS sensors can be provided on, or substantially symmetrically about, a center of gravity of a vehicle. Accordingly, accuracy of the GPS sensors in detecting a vehicle position can be significantly increased.

As shown in the preferred embodiments of the present invention, components and elements provided on each of the vehicle roofs 100, 100A, 200, 300, and 300A can be positioned within the bounds of a vehicle frame, in particular, within the length of a vehicle body in a front-rear direction and within a width of the vehicle body in a left-right direction. Some or all of the components and elements provided on each of the vehicle roofs 100, 100A, 200, 300, and 300A can also be positioned within a height of the vehicle in the up-down direction. Accordingly, by positioning the components and elements provided on each of the vehicle roofs 100, 100A, 200, 300, and 300A within the bounds of the vehicle frame, the components and elements provided on each of the vehicle roofs 100, 100A, 200, 300, and 300A (e.g., light sources 121, 221, and 321) can be significantly reduced or prevented from coming into contact with foreign objects (e.g., vines, branches, posts, buildings, doors, etc.) both while the vehicle is moving and while the vehicle is stationary.

In the preferred embodiments of the present invention, the light sources 121, 221, and 321 can include blinker lights that enable an administrator or operator at an exterior of a vehicle to easily visually check an operation state of the vehicle.

The solar panels 120, 220, and 320 are not limited to the specific positions respectively shown on each of the vehicle roofs 100, 200, and 300. For example, the solar panels 120, 220, and 320 may be located on a hood of a vehicle. Furthermore, solar panels may be provided both on a vehicle roof and on a hood of a vehicle.

Features and elements of each of the vehicle roofs 100, 100A, 200, 300, and 300A may be combined with, or replace one another. In addition, each of the vehicle roofs 100, 100A, 200, 300, and 300A can be mounted on a combustion-driven vehicle or an electric vehicle. A vehicle that includes any of the vehicle roofs 100, 100A, 200, 300, and 300A can be an autonomous vehicle. Although side batteries 355A are only shown in FIGS. 21-23 with respect to the vehicle 300A, it is noted that side batteries 355A can be included with any of the vehicles disclosed herein.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A vehicle comprising:
- a roof supported by a frame connected to a main body of the vehicle or defined by a cabin of the vehicle; and
- a solar panel attached to the roof; wherein
- the solar panel is provided in a main recess of the roof;
- the roof includes at least one secondary recess;
- the main recess is inclined toward the at least one secondary recess;
- the main recess of the roof is defined by a recess in an upper surface of the roof; and
- a height of the upper surface of the roof above the main recess increases towards a center of the roof in a left-right direction.

2. The vehicle according to claim 1, wherein the at least one secondary recess is continuous with the main recess.

3. The vehicle according to claim 1, wherein the at least one secondary recess is a drain groove.

4. The vehicle according to claim 1, wherein the at least one secondary recess is inclined away from the main recess.

5. The vehicle according to claim 1, further comprising:
- at least one electrical component that is mounted on or integrated with the roof; wherein
- the secondary recess is positioned to not overlap, in a vertical direction, with the at least one electrical component.

6. The vehicle according to claim 5, wherein the at least one electrical component includes one or more of a light source, a weather sensor, a camera, and a GPS (Global Positioning System) sensor.

7. The vehicle according to claim 5, wherein the at least one electrical component is provided within a length of the main body of the vehicle in a front-rear direction and within a width of the main body of the vehicle in a left-right direction.

8. The vehicle according to claim 5, wherein an innermost edge of the secondary recess is located outside of an outermost edge of the at least one electrical component in a left-right direction.

9. The vehicle according to claim 1, further comprising:
- a windshield, wherein
- the secondary recess is positioned to not overlap, in a vertical direction, with the windshield of the vehicle.

10. The vehicle according to claim 1, further comprising:
- at least one GPS (Global Positioning System) sensor provided on the roof.

11. The vehicle according to claim 10, wherein the at least one GPS sensor is provided in a GPS recess in a main surface of the roof.

12. The vehicle according to claim 10, wherein the at least one GPS sensor includes one or more GPS sensors located at an end of the roof opposite to an end of the roof that includes the at least one secondary recess.

13. The vehicle according to claim 10, wherein the at least one GPS sensor is located on, or substantially symmetrical about, at least one of a longitudinal centerline and a lateral centerline of the vehicle.

14. The vehicle according to claim 1, wherein:
- the secondary recess is located at a front portion of the roof and extends a first distance in a front-rear direction;
- the roof further includes a tertiary recess located at a rear portion of the roof and extending a second distance in the front-rear direction; and
- the first distance is greater than the second distance.

15. The vehicle according to claim 1, wherein the roof includes an interior void space in which at least one electrical component or at least one cable is provided.

16. The vehicle according to claim 1, further comprising at least one support pillar that is attached to or integrated with the roof.

17. The vehicle according to claim 16, wherein the at least one support pillar and the roof define a roll-over protection system for the vehicle.

18. The vehicle according to claim 1, wherein a portion or an entirety of the solar panel is inclined with respect to a main surface of the roof.

* * * * *